US012690011B2

(12) United States Patent
Yan et al.

(10) Patent No.: US 12,690,011 B2
(45) Date of Patent: Jul. 21, 2026

(54) DECODING PAGING MESSAGES BASED ON MULTIPLE BEAMS

(71) Applicant: Apple Inc., Cupertino, CA (US)

(72) Inventors: Hongbo Yan, Vista, CA (US); Amir Farajidana, Sunnyvale, CA (US); Dietmar Gradl, Ebersberg (DE)

(73) Assignee: Apple Inc., Cupertino, CA (US)

( * ) Notice: Subject to any disclaimer, the term of this patent is extended or adjusted under 35 U.S.C. 154(b) by 951 days.

(21) Appl. No.: 17/852,010

(22) Filed: Jun. 28, 2022

(65) Prior Publication Data

US 2023/0032356 A1 Feb. 2, 2023

Related U.S. Application Data

(60) Provisional application No. 63/227,908, filed on Jul. 30, 2021.

(51) Int. Cl.
| | |
|---|---|
| *H04W 68/00* | (2009.01) |
| *H04W 24/08* | (2009.01) |
| *H04W 56/00* | (2009.01) |
| *H04W 68/02* | (2009.01) |
| *H04W 72/1273* | (2023.01) |
| *H04W 76/28* | (2018.01) |

(52) U.S. Cl.
CPC ......... *H04W 68/005* (2013.01); *H04W 24/08* (2013.01); *H04W 56/001* (2013.01); *H04W 68/02* (2013.01); *H04W 72/1273* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 10,884,855 B1 * | 1/2021 | Yazovitsky | ......... G11C 11/4074 |
| 2018/0249423 A1 | 8/2018 | Garcia et al. | |
| 2020/0389221 A1 | 12/2020 | He et al. | |
| 2020/0396744 A1 | 12/2020 | Xiong et al. | |
| 2021/0058135 A1 | 2/2021 | Jung et al. | |
| 2021/0410130 A1 | 12/2021 | Rahman et al. | |
| 2022/0330211 A1 | 10/2022 | Awad et al. | |

(Continued)

FOREIGN PATENT DOCUMENTS

| | | |
|---|---|---|
| CN | 111294851 A | 6/2020 |
| CN | 111294923 A | 6/2020 |
| CN | 111819802 A | 10/2020 |
| CN | 112314022 A | 2/2021 |

(Continued)

OTHER PUBLICATIONS

Non-Final Office Action issued in U.S. Appl. No. 17/886,909, dated Oct. 23, 2024 in 18 pages.

(Continued)

*Primary Examiner* — Jutai Kao
(74) *Attorney, Agent, or Firm* — Kilpatrick Townsend & Stockton LLP

(57) ABSTRACT

The present application relates to a paging mechanism. In an example, a network can transmit SSBs periodically on multiple SSB beams. A UE can receive, during a DRX cycle, an SSB per detected SSB beam and perform SSB-based measurements. Based on these measurements, the UE can perform PDCCH monitoring and PDSCH decoding on at least two beams. The PDCCH monitoring can indicate a scheduled paging message from the network. The PDSCH decoding can allow the UE to determine the paging message.

20 Claims, 17 Drawing Sheets

700

Receiving, during an active state of a discontinuous reception (DRX) cycle, a plurality of synchronization signal blocks (SSBs) that respectively correspond to a plurality of beams of a base station 702

Determining a plurality of measurements that respectively correspond to the plurality of SSBs 704

Selecting a first measurement from the plurality of measurements 706

Comparing the first measurement of the plurality of measurements to a measurement threshold 708

Scheduling, based on said comparing, page monitoring and page receiving on at least two beams of the plurality of beams 710

(56)                  References Cited

U.S. PATENT DOCUMENTS

2023/0217412 A1* 7/2023 Zhang ................... H04W 68/02
                                                                  455/458
2023/0319747 A1* 10/2023 Goyal ................... H04W 68/02
                                                                  370/503
2023/0397167 A1* 12/2023 Murray ............... H04W 68/025
2024/0121714 A1* 4/2024 Kwon ................ H04W 68/005

FOREIGN PATENT DOCUMENTS

| EP | 3240340 A1 | 11/2017 |
| EP | 3490184 A1 | 5/2019 |
| EP | 3758252 A1 | 12/2020 |
| WO | 2019061910 A1 | 4/2019 |

OTHER PUBLICATIONS

European Patent Application No. 22191364.3, Extended European Search Report, Jan. 4, 2023, 9 pages.

On TRS/CSI-RS Occasion(s) for idle/inactive UEs, Sony, R1-2008369, 3GPP TSG RAN WG1 #1 03-e, 2020, 7 pages.
Power Consumption by UE in RRC Idle/Inactive, Samsung, R2-2006775, 3GPP TSG-RAN2 Meeting #111 Electronic, Aug. 2020, 4 pages.
European Patent Application No. 22172260.6, Extended European Search Report, Mailed on Oct. 18, 2022, 10 pages.
"Paging Enhancement for UE Power Saving", 3rd Generation Partnership Project Technical Specification Group-Radio Access Network Working Group1 Meeting #105, Lenovo, Motorola Mobility, R1-2105770, May 10-27, 2021, 5 pages.
U.S. Appl. No. 17/886,909, "Final Office Action", filed May 13, 2025, 12 pages.
European Patent Application No. 22172260.6, "Office Action", Jul. 31, 2025, 5 pages.
U.S. Appl. No. 17/886,909, "Notice of Allowance", filed Oct. 14, 2025, 7 pages.
Chinese Patent Application No. 202210611770.4, "Notice of Decision to Grant", May 18, 2026, 7 pages.

* cited by examiner gNB
108

UE
104

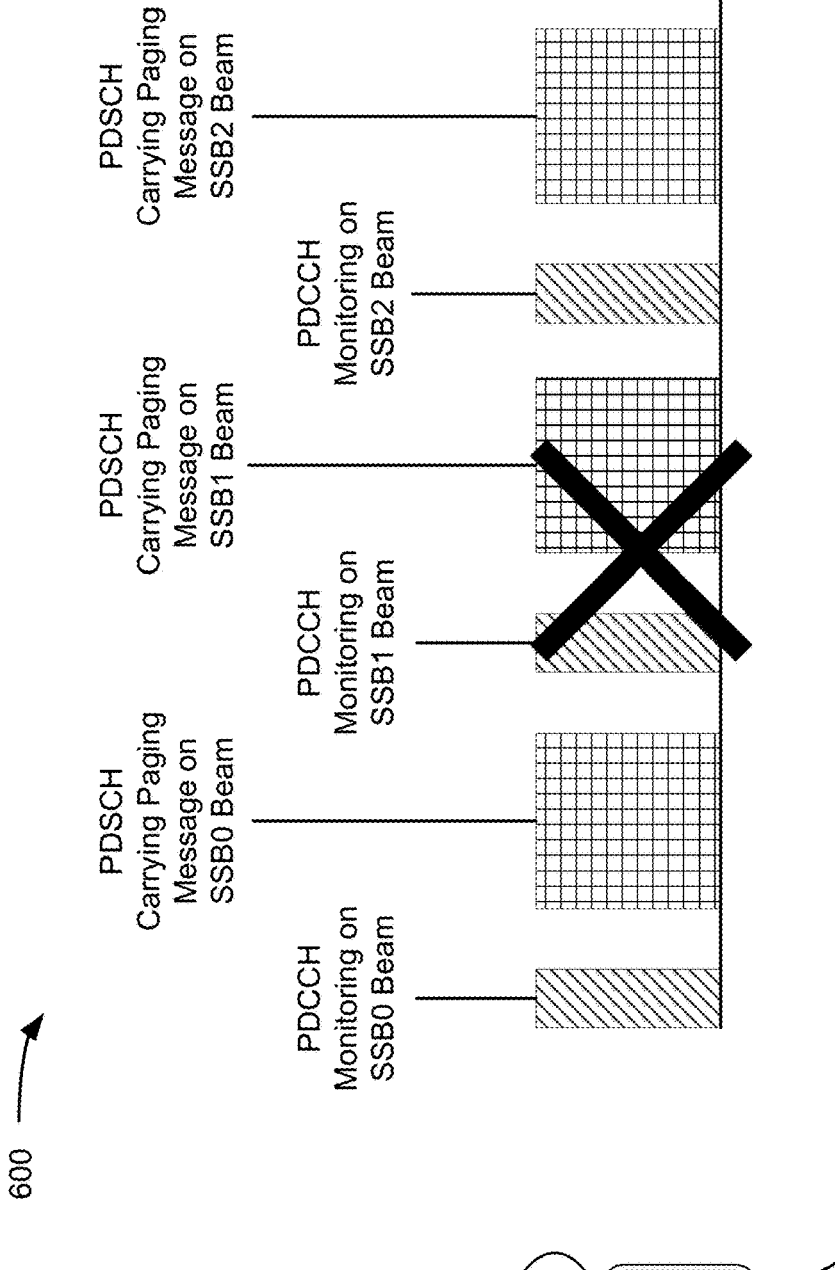
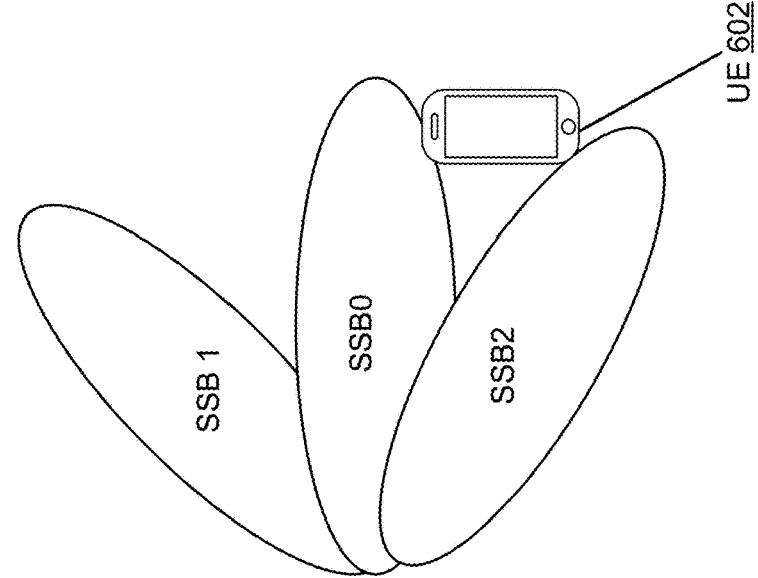
FIG. 6

Figure 7:
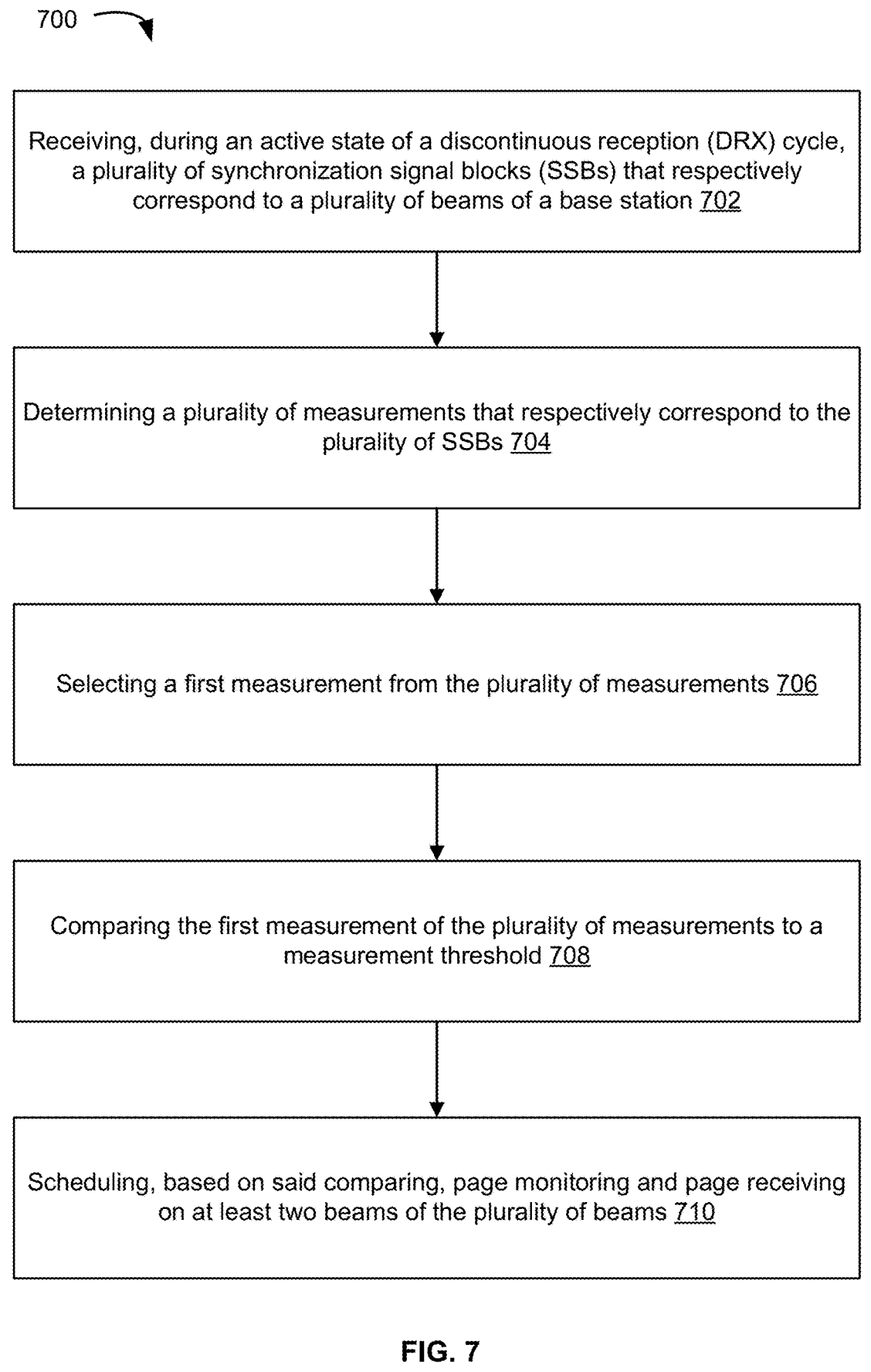

700

Receiving, during an active state of a discontinuous reception (DRX) cycle, a plurality of synchronization signal blocks (SSBs) that respectively correspond to a plurality of beams of a base station 702

Determining a plurality of measurements that respectively correspond to the plurality of SSBs 704

Selecting a first measurement from the plurality of measurements 706

Comparing the first measurement of the plurality of measurements to a measurement threshold 708

Scheduling, based on said comparing, page monitoring and page receiving on at least two beams of the plurality of beams 710

Performing SSB search and measurement 802

Sorting detected SSB beams according to performance metric 804

Y                Metric of
best SSB beam >
threshold?
806                N

Scheduling page monitoring and page receiving on the best SSB beam 810

Scheduling page monitoring and page receiving on the best SSB beam and other SSB beam(s) 820

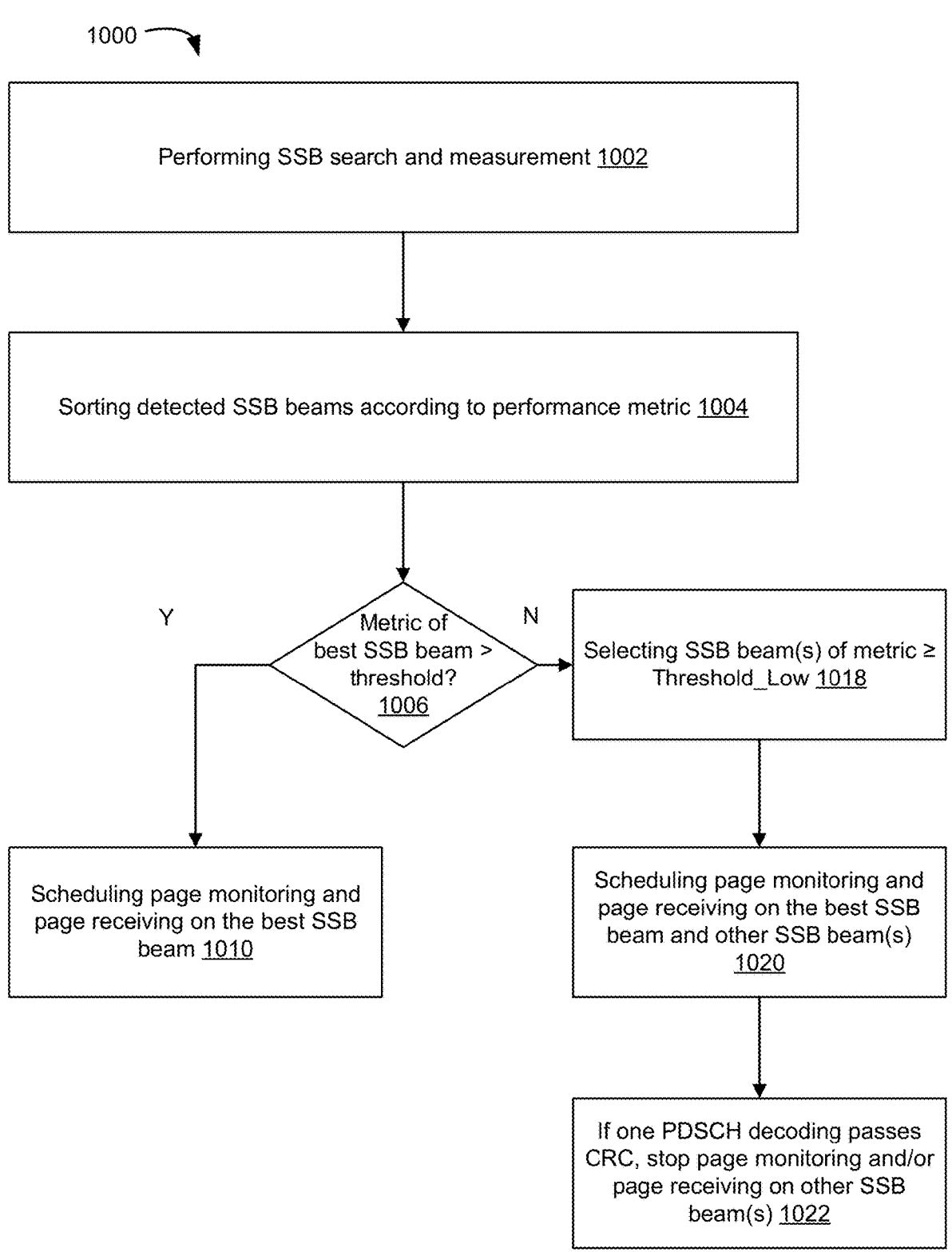

1000

Performing SSB search and measurement 1002

Sorting detected SSB beams according to performance metric 1004

Metric of best SSB beam > threshold? 1006

Y

N

Selecting SSB beam(s) of metric ≥ Threshold_Low 1018

Scheduling page monitoring and page receiving on the best SSB beam 1010

Scheduling page monitoring and page receiving on the best SSB beam and other SSB beam(s) 1020

If one PDSCH decoding passes CRC, stop page monitoring and/or page receiving on other SSB beam(s) 1022

FIG. 10

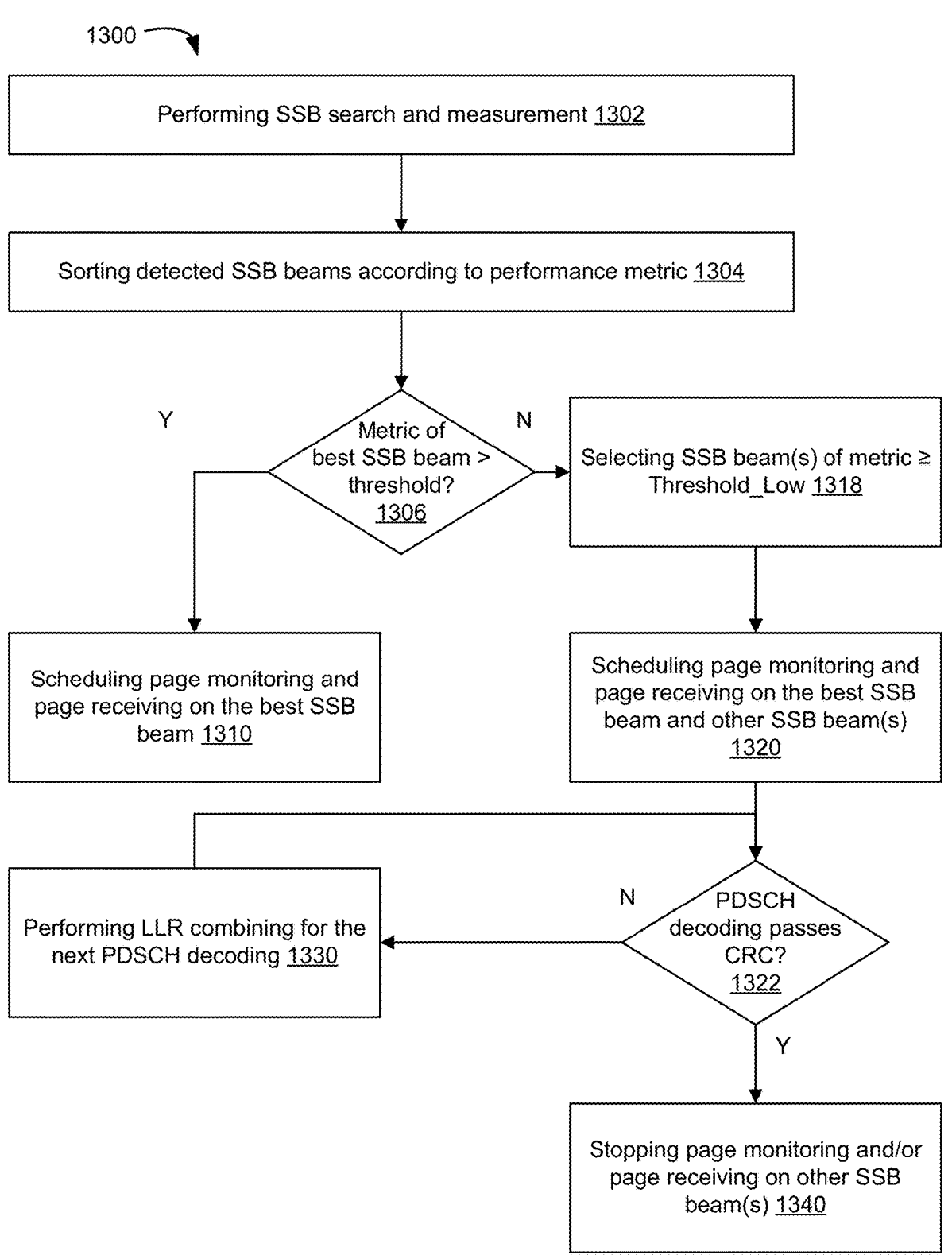

1300

Performing SSB search and measurement 1302

Sorting detected SSB beams according to performance metric 1304

Metric of best SSB beam > threshold? 1306

Y

N

Selecting SSB beam(s) of metric ≥ Threshold_Low 1318

Scheduling page monitoring and page receiving on the best SSB beam 1310

Scheduling page monitoring and page receiving on the best SSB beam and other SSB beam(s) 1320

Performing LLR combining for the next PDSCH decoding 1330

N

PDSCH decoding passes CRC? 1322

Y

Stopping page monitoring and/or page receiving on other SSB beam(s) 1340

FIG. 13

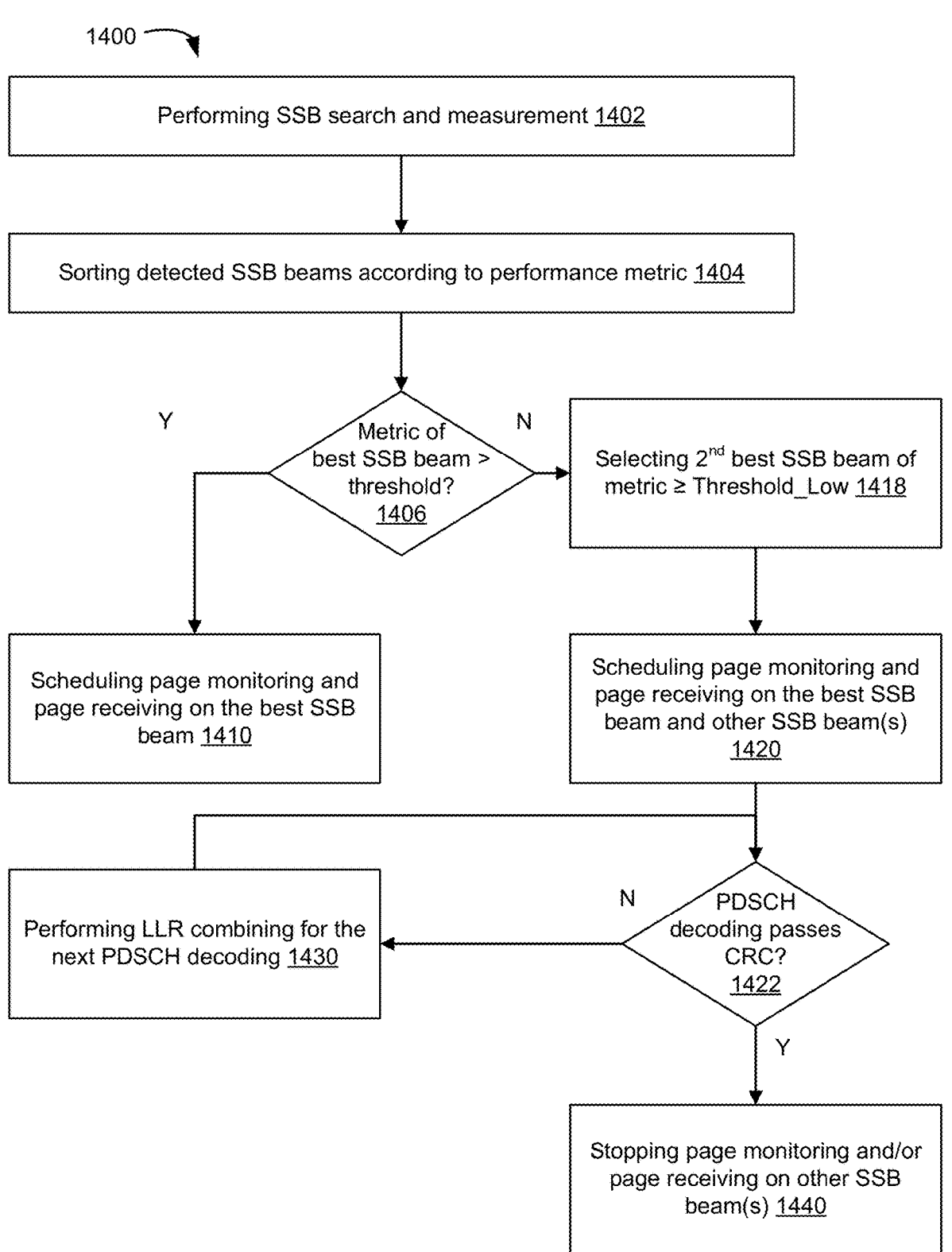

1400

Performing SSB search and measurement 1402

Sorting detected SSB beams according to performance metric 1404

Metric of best SSB beam > threshold? 1406

Y

N

Selecting 2nd best SSB beam of metric ≥ Threshold_Low 1418

Scheduling page monitoring and page receiving on the best SSB beam 1410

Scheduling page monitoring and page receiving on the best SSB beam and other SSB beam(s) 1420

Performing LLR combining for the next PDSCH decoding 1430

N

PDSCH decoding passes CRC? 1422

Y

Stopping page monitoring and/or page receiving on other SSB beam(s) 1440

FIG. 14

DECODING PAGING MESSAGES BASED ON MULTIPLE BEAMS

CROSS-REFERENCE TO RELATED APPLICATION

This application claims the benefit of U.S. Provisional Patent Application No. 63/227,908, filed on Jul. 30, 2021, which is herein incorporated by reference in its entirety for all purposes.

BACKGROUND

Fifth generation mobile network (5G) is a wireless standard that aims to improve upon data transmission speed, reliability, availability, and more. This standard, while still developing, includes numerous details relating to cell selection/reselection, where, for instance, a user equipment (UE) can communicate with a network to send and receive data. The UE can operate in a discontinuous reception (DRX) mode to reduce its power consumption, whereby the UE can deactivate some of its transmission and/or reception components for a certain period of time during which no data communication occurs.

BRIEF DESCRIPTION OF THE DRAWINGS

FIG. 6 illustrates another example of a timing diagram for receiving paging occasions and paging messages on SSB beams, in accordance with some embodiments.

FIG. 7 illustrates an example of an operational flow/algorithmic structure for scheduling page monitoring and page receiving, in accordance with some embodiments.

FIG. 10 illustrates another example of an operational flow/algorithmic structure for scheduling page monitoring and page receiving based on a subset of SSB beams, in accordance with some embodiments.

FIG. 13 illustrates another example of an operational flow/algorithmic structure for scheduling page monitoring and page receiving based on a subset of SSB beams and on combining soft decoding information, in accordance with some embodiments.

FIG. 14 illustrates another example of an operational flow/algorithmic structure for scheduling page monitoring and page receiving based on the highest ranked SSB beams and on combining soft decoding information, in accordance with some embodiments.

DETAILED DESCRIPTION

Figure 1:
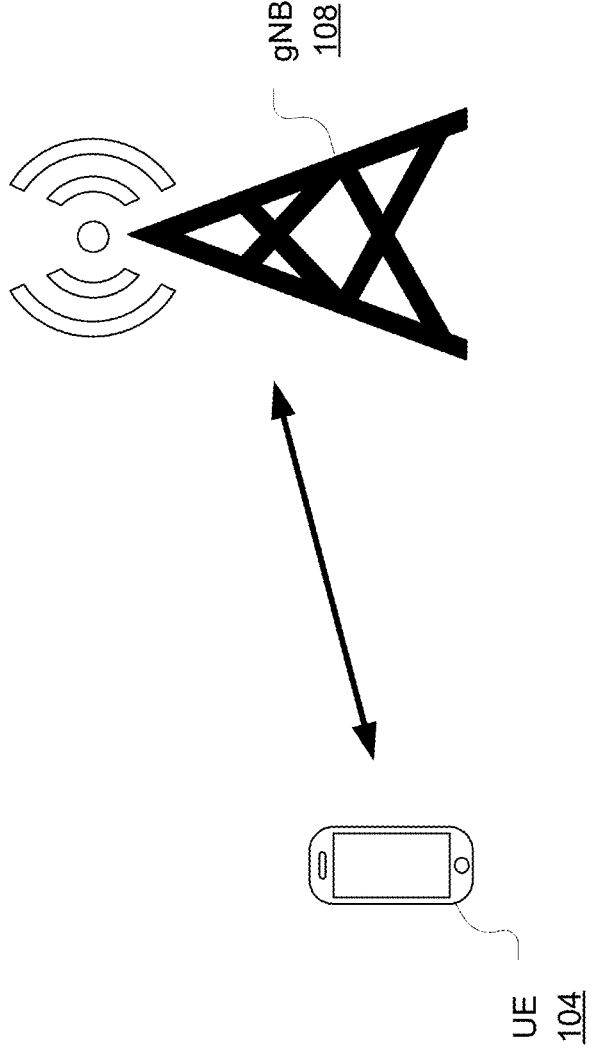
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate with a network, such as with one or more base stations or other network nodes. To improve the UE's power consumption, the UE can operate in an idle mode. Nonetheless, during the idle mode, the network may need to communication information to the UE. Accordingly, the network can, in a paging occasion, indicate to the UE a paging message that, in turn, indicates to the UE a procedure to perform. Also in support of the idle mode, the UE periodically wakes up during a DRX cycle to receive reference signals, such as synchronization signal (SS)/PBCH blocks (SSBs). SSBs can be sent on multiple SSB beams and can be used for, for example, beam selection.

Because the UE needs to be in an active state to receive the reference signals, the signal reception can consume power. To improve the power consumption, it may be sufficient for the UE to wake up during a DRX cycle a small number of times (e.g., once) to receive an SSB per SSB beam, perform SSB measurements, and determine performance metrics (e.g., signal-to-noise ratio (SNR) and/or a reference signal received power (RSRP) measurement) of the SSB beams. If one of the SSB beams has a good SSB coverage (e.g., is associated with a performance metric that is greater than a metric threshold), the paging mechanism (e.g., including any or both of the page monitoring and page receiving) can be scheduled on that SSB beam. Otherwise, the paging mechanism can be scheduled on multiple SSB beams without the need to wake up and receive SSB(s) multiple times. In this way, the paging mechanism can be supported by the UE on one SSB beam if there is a good SSB beam coverage (which is indicated by the SSB beam's performance metric) or on multiple SSB beams if no single good SSB beam coverage exists. By reducing the number of times the UE needs wake up for SSB reception, the overall power consumption of the UE can be reduced.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities that is a network node of a communications network (or, more briefly, network) and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects, or services accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements at a common communication protocol layer have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a SSB. The SSBs may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction and PUSCH and PUCCH in the uplink direction.

In an example, communications with the gNB 108 and/or the base station can use channels in the frequency range 1 (FR1), frequency range 2 (FR2), and/or a higher frequency range (FRH). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

To improve the UE's 104 power consumption, the UE 104 can operate in an idle mode. In support of the idle mode, the UE 104 may perform multiple mechanism. One mechanism relates to SSB measurements. In particular, the UE 104 stays, during the idle mode, in a sleeping mode (e.g., a sleep state or de-active state) of a DRX cycle and periodically wakes up (e.g., a wake state or an active state) to receive SSBs. SSB measurements are derived for different reasons including beam selection. Another mechanism relates to paging. For instance, during the idle mode, the network may need to communication information to the UE 104. Accordingly, the network (e.g., gNB 108) can send to the UE 104 a DCI on a paging occasion to indicate to the UE a paging message that, in turn, indicates to the UE 104 a procedure to perform. The paging message (if one exists) can be repeatedly sent on multiple SSB beams (e.g., each SSB beam can be used to transmit a DCI on the paging occasion and the paging message (if one exists)). When both mechanisms are used (e.g., beam selection and paging), the UE 104 may wake up to receive one or more SSBs per beam and may then schedule the monitoring of the page occasion for a DCI and/or the detection of the paging message on one or more SSB beams. Improvements to the power consumption of the UE 104 are possible by reducing the number of times the UE 104 needs to wake up. This reduction can be achieved by using a single beam when the beam coverage permits and, otherwise, using at least two beams for the paging mechanism. These and other functionalities are described in connection with the next figures.

Figure 2:
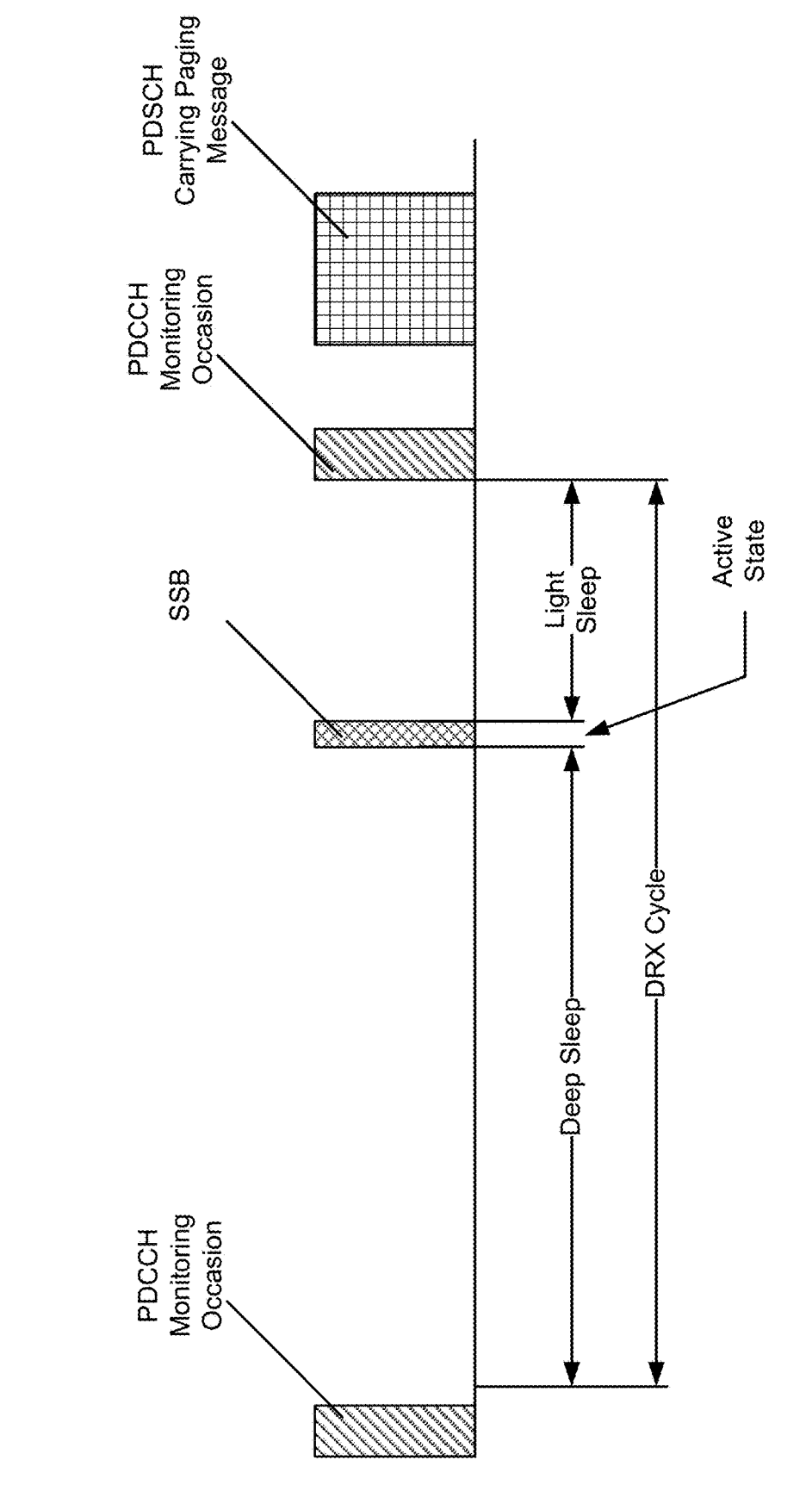
FIG. 2 illustrates an example of timing diagram of a DRX cycle and related SSB reception, in accordance with some embodiments.

FIG. 2 illustrates an example of timing diagram 200 of a DRX cycle and related SSB reception, in accordance with some embodiments. This figure illustrates how a UE (e.g., such as the UE 104 of FIG. 1) can receive an SSB in support of performing SSB measurements. The SSB reception can corresponds to a direct beam coverage, as further illustrated in FIG. 5. Because of the direct beam coverage, the coverage quality can be relatively high (e.g., as indicated by the SNR or RSRP measurement determined based on the SSB). Because of the relatively high quality, a single SSB reception may be sufficient.

In the illustration of FIG. 2, the UE may be operating in an idle mode where no data is being communicated with the network. The UE can deactivate (e.g., turn off or enter a power save mode) some or all of its RF components (e.g., transmission components and/or reception components) during a DRX cycle to reduce its power consumption. Nonetheless, the UE can wake up to receive an SSB transmitted from the network. As such, the DRX cycle can be divided into multiple sub-cycles: a deep sleep cycle, an active state cycle, and a light sleep cycle. The deep sleep cycle is associated with the least power consumption, whereas the active state cycle is associated with the highest power consumption of the UE during the DRX cycle. In particular, during the deep sleep cycle, the RF components are deactivated and the UE does not receive or transmit to the network. During the active state cycle, the UE is woken up (e.g., its RF components are activated) to enable reception and/or transmission. The light sleep cycle can follow the active state cycle, whereby some but not all of the RF components are deactivated (e.g., in this way, if the UE needs to re-enter the active state cycle, the switch from the light sleep cycle to the active state cycle is relatively faster than the equivalent switch from the deep sleep cycle; for instance, RF tuning can be faster given the smaller subset of RF components that are deactivated in the light sleep cycle).

In an example, during the active state cycle, the UE is in an active state that enables it to receive a reference signal, such as an SSB as illustrated in FIG. 2. Generally, SSBs are periodically transmitted by the network (e.g., in the order of a few tens of milliseconds, such as every twenty milliseconds). The UE wakes up to receive the SSB for the purpose of frequency and timing tracking. Such tracking is usable for facilitating the paging mechanism. The time window during which the UE wakes up (e.g., equivalently, needs to be in the active state) can be pre-configured. For instance, this time window can be an SSB measurement timing configuration (SMTC) window.

In the illustration of FIG. 2, the UE can receive and perform SSB measurement on the SSBs to determine a coverage quality, such as the SNR or RSRP. Given that a relatively high coverage quality is detected (e.g., the SNR or RSRP is greater than a metric threshold), the UE need not wake up multiple times to receive the SSB multiple times. Instead, the active state cycle can be followed by the light sleep cycle (or, even by the deep sleep cycle).

As also illustrated in FIG. 2, a paging occasion can be transmitted by the network to the UE. Generally, the paging occasion can be a PDCCH monitoring occasion, whereby the UE can perform blind decoding in a search space of the PDCCH to determine the paging occasion. This paging occasion can include DCI that schedules a paging message on a PDSCH. Also generally, resources of the PDSCH (e.g., the scheduled resource elements) can carry (e.g., encode) the information of the paging message. If the paging message is scheduled (e.g., as indicated by the DCI), the UE can decode the paging message from the resources of the PDSCH.

In the particular illustration of FIG. 2, a first PDCCH monitoring occasion is sent before the UE goes into the deep sleep cycle. In the absence of a detected DCI on this PDCCH monitoring occasion, the UE enters the deep sleep cycle. Subsequently, a second PDCCH monitoring occasion is sent to the UE, while the UE may have exited the DRX cycle. Given the frequency and timing tracking based on the single SSB reception, this second PDCCH monitoring occasion can be detected by the UE that then determines that a paging message is scheduled on the PDSCH and the UE decodes this paging message based on the scheduled resources of the PDSCH that carry the paging message and performs the procedure indicated in the decoded paging message.

Figure 3:
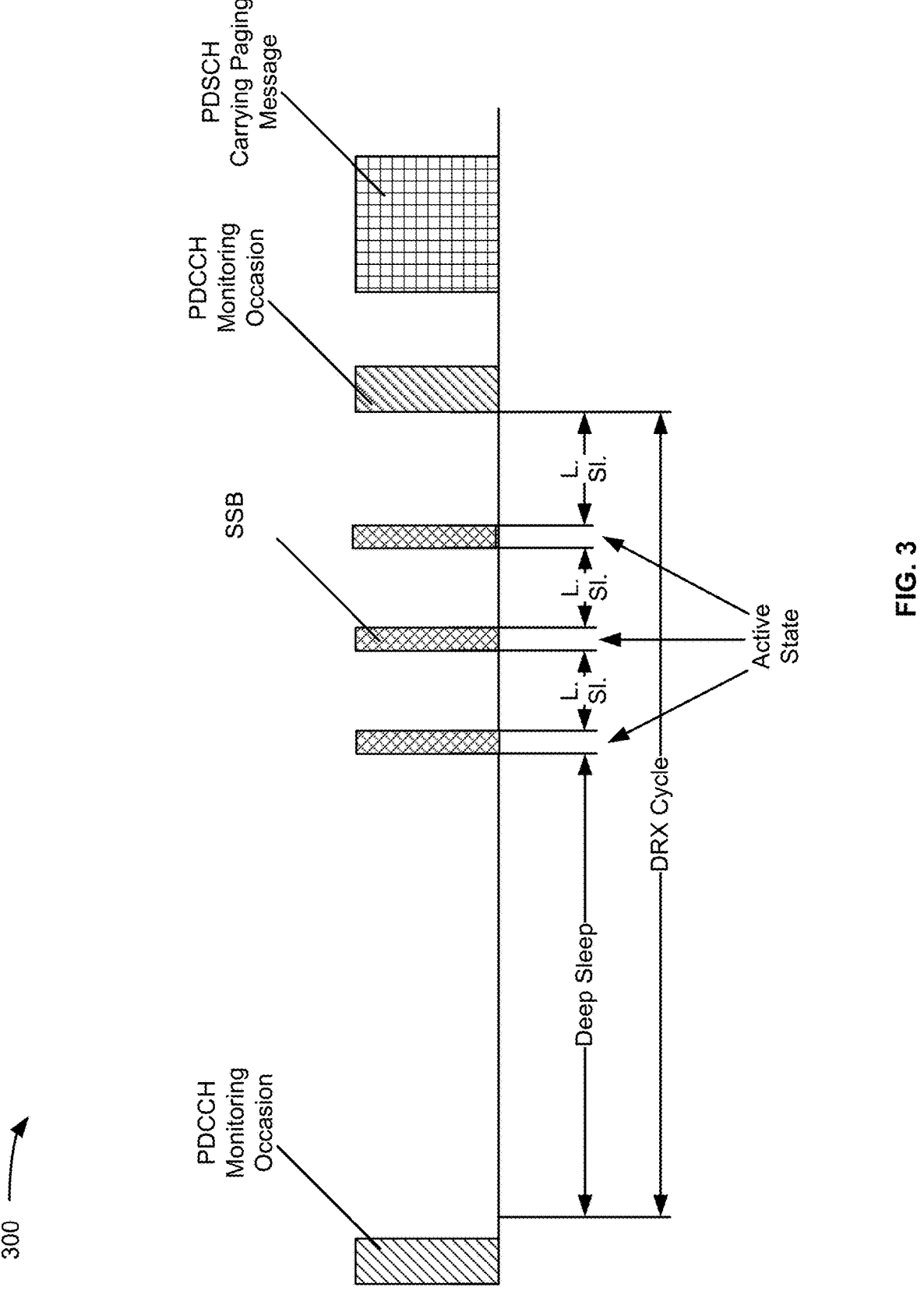
FIG. 3 illustrates another example of timing diagram of a DRX cycle and related multiple SSB receptions, in accordance with some embodiments.

FIG. 3 illustrates another example of timing diagram 300 of a DRX cycle and related multiple SSB receptions, in accordance with some embodiments. This figure illustrates how a UE (e.g., the UE 104 of FIG. 1) can receive multiple SSBs in support of performing SSB measurements. The SSB receptions can corresponds to an indirect beam coverage, as further illustrated in FIG. 6. Because of the indirect beam coverage, the coverage quality can be relatively low (e.g., as indicated by the SNR or RSRP measurements). Because of the relatively low quality, multiple SSB receptions may be needed.

In the illustration of FIG. 3, the UE may be operating in an idle mode where no data is being communicated with the network. The UE can deactivate some or all of its RF components during a DRX cycle to reduce its power consumption. Nonetheless, the UE can wake up to receive an SSB transmitted from the network. Here, and unlike the illustration of FIG. 2, the UE can determine a relatively low coverage quality (e.g., based on SNR and/or RSRP measurements determined based on one or more SSBs). Accordingly, the UE needs to wake up a few times for better frequency and timing offset estimation quality. Generally, good frequency and timing estimates are needed for satisfactory paging message decoding. This can be especially true for six or seven symbol long PDSCH with mapping type A and a single symbol DMRS. In particular, a single symbol DMRS may not provide a frequency estimate refinement. and a longer PDSCH time span leads to a larger relative phase shift between the symbols at the beginning and the end of the PDSCH (e.g., the symbols of the paging message).

Because of the relatively lower coverage quality, the UE wakes up a higher number of times (relative to the illustration of FIG. 2) to receive multiple SSBs which in order to improve the frequency and timing tracking. FIG. 3 illustrates an example, where the UE wakes three times (although a different number is also possible). As such, the DRX cycle includes a deep sleep cycle, followed by a first active state cycle where the UE receives a first SSB, followed by a first light sleep cycle, then followed (e.g., depending on the SSB transmission periodicity) by a second active state cycle where the UE receives a second SSB, followed by a second light sleep cycle, then followed by a third active state cycle where the UE receives a third SSB, and followed by a third light sleep cycle. In comparison to the timing diagram 200 of FIG. 2, here the UE wakes two more times for SSB reception, resulting in a relative increase of the UE's power consumption.

As such, the result of low coverage quality can include the UE waking multiple times. And the result of the UE waking up multiple time can include shorter overall sleep time, shorter efficient deep sleep time, and/or more baseband processing occasions. In other words, additional current consumption may be needed.

As also illustrated in FIG. 3, a first PDCCH monitoring occasion is sent to the UE before the UE goes into the deep sleep cycle. In the absence of a detected DCI on this PDCCH monitoring occasion, the UE enters the deep sleep cycle. Subsequently, a second PDCCH monitoring occasion is sent to the UE while the UE may have exited the DRX cycle. Given the refined frequency and timing tracking based on the multiple SSB receptions, a DCI on this second PDCCH monitoring occasion can be detected by the UE that then determines that a paging message is scheduled on the PDSCH and the UE decodes this paging message based on the scheduled resources of the PDSCH that carry the paging message and performs the procedure indicated in the decoded paging message.

Figure 4:
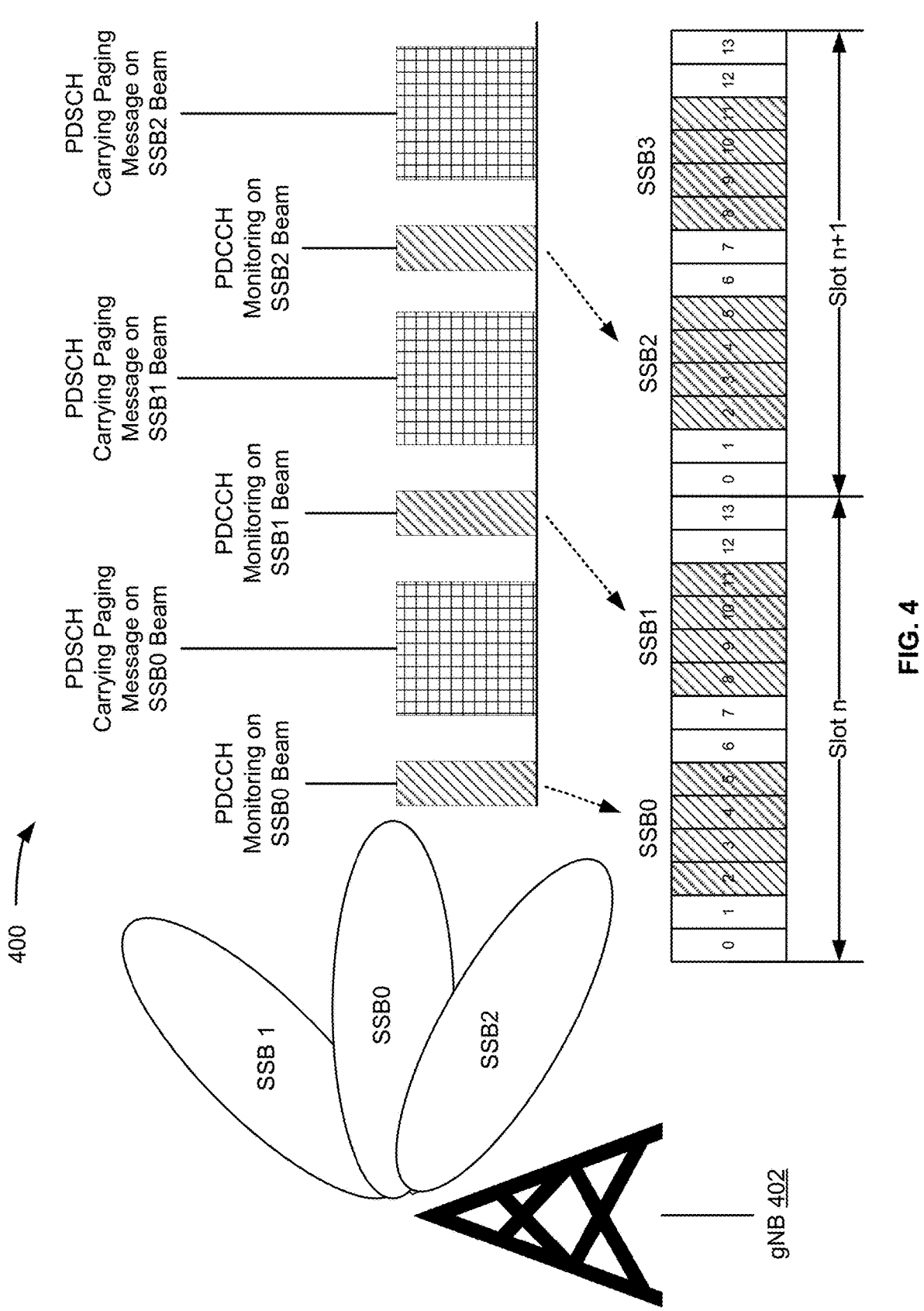
FIG. 4 illustrates an example of a timing diagram for transmitting paging occasions and paging messages on SSB beams.

FIG. 4 illustrates an example of a timing diagram 400 for transmitting paging occasions and paging messages on SSB beams, in accordance with some embodiments. As illustrated, a network node 402 (e.g., the gNB 108 of FIG. 1) can transmit paging occasions and paging messages to a UE (e.g., the UE 104 of FIG. 1) using multiple SSB beams.

Generally, the network node 402 can transmit multiple SSBs in a burst set period with each SSB potentially in a different beam. These beams are referred to herein as SSB beams (e.g., an analog beam dedicated to a specific SSB). The UE performs beam sweeping to select one or more SSB beams (e.g., an SSB beam that has the highest performance metrics among the SSB beams, where the performance metrics are determined based on the SSBs) for communication with the network node 402.

In the illustration of FIG. 4, the network node 402 performs beam sweeping to transmit the SSB beams at predefined directions in a burst within a regular interval. These SSB beams are indexed with SSB beam indexes "i" (shown in FIG. 2 as "i" equal to "0," "1," and "2"). An SSB caries the PSS, the SSS, and the PBCH and is repeated in the SSB beams in a burst, and this SS burst is repeated periodically. A cell can be covered by up to four SSB beams for a sub-3 GHz carrier and up to eight SSB beams for a carrier with a three to six GHz range.

As shown in the bottom of FIG. 4, an SSB occupies multiple symbols in a slot (FIG. 4 shows each SSB occupying four symbols in a slot "n" as an illustrative example). Further, the SSBs over different SSB beams can be transmitted back-to-back in clusters as shown below. For example, and referring to the illustration of FIG. 4, SSB0 and SSB1 are transmitted in a first slot, and SSB2 and SSB3 are transmitted in a second slot immediately after having the index "n+1". The transmissions can be repeated periodically in other slots, such as in a first slot that carries SSB0 and SSB1, and a second slot that carries SSB2 and SSB3.

The network 402 transmits a paging message over all deployed beams within a cell to ensure (e.g., increase or maximize the likelihood) that the UE receives the paging message no matter where the UE is within the cell. For example, a paging occasion of the paging message is sent in resource elements of a PDCCH search space on each beam. The paging message is also sent in resource elements of a PDSCH on each beam.

In the illustration of FIG. 4, three SSB beams are illustrated (SSB3 is only shown in the bottom portion of the figure, and the description of the three SSB beams equivalently applies to the beam that carries SSB3). The paging occasion and the paging message are each transmitted three times, once on each of the three SSB beams. The paging occasion and paging message on SSB0 beam are illustrated in FIG. 4 as PDCCH monitoring on SSB0 beam and PDSCH carrying paging message on SSB0 beam, respectively. Similarly, the paging occasion and paging message on SSB1 beam are illustrated in FIG. 4 as PDCCH monitoring on SSB1 beam and PDSCH carrying paging message on SSB1 beam, respectively. Additionally, the paging occasion and paging message on SSB2 beam are illustrated in FIG. 4 as PDCCH monitoring on SSB2 beam and PDSCH carrying paging message on SSB2 beam, respectively.

The timing diagram 400 illustrates an example where the paging occasion and paging message on SSB0 beam are received by the UE first, followed by the reception of the paging occasion and paging message on SSB1 beam, and then by the reception of the paging occasion and paging message on SSB2 beam. However, variations to the timing diagram 400 are possible and can depend on, for instance, the RF environment and/or location of the UE within the cell. Generally the paging occasion on an SSB beam precedes the paging message on that same SSB beam. However, the paging occasion on a first SSB beam can precede or follow a paging occasion or a paging message on a second SSB beam. Additionally or alternatively, the paging message on the first SSB beam can precede or follow the paging occasion or the paging message on the second SSB beam.

Figure 5:
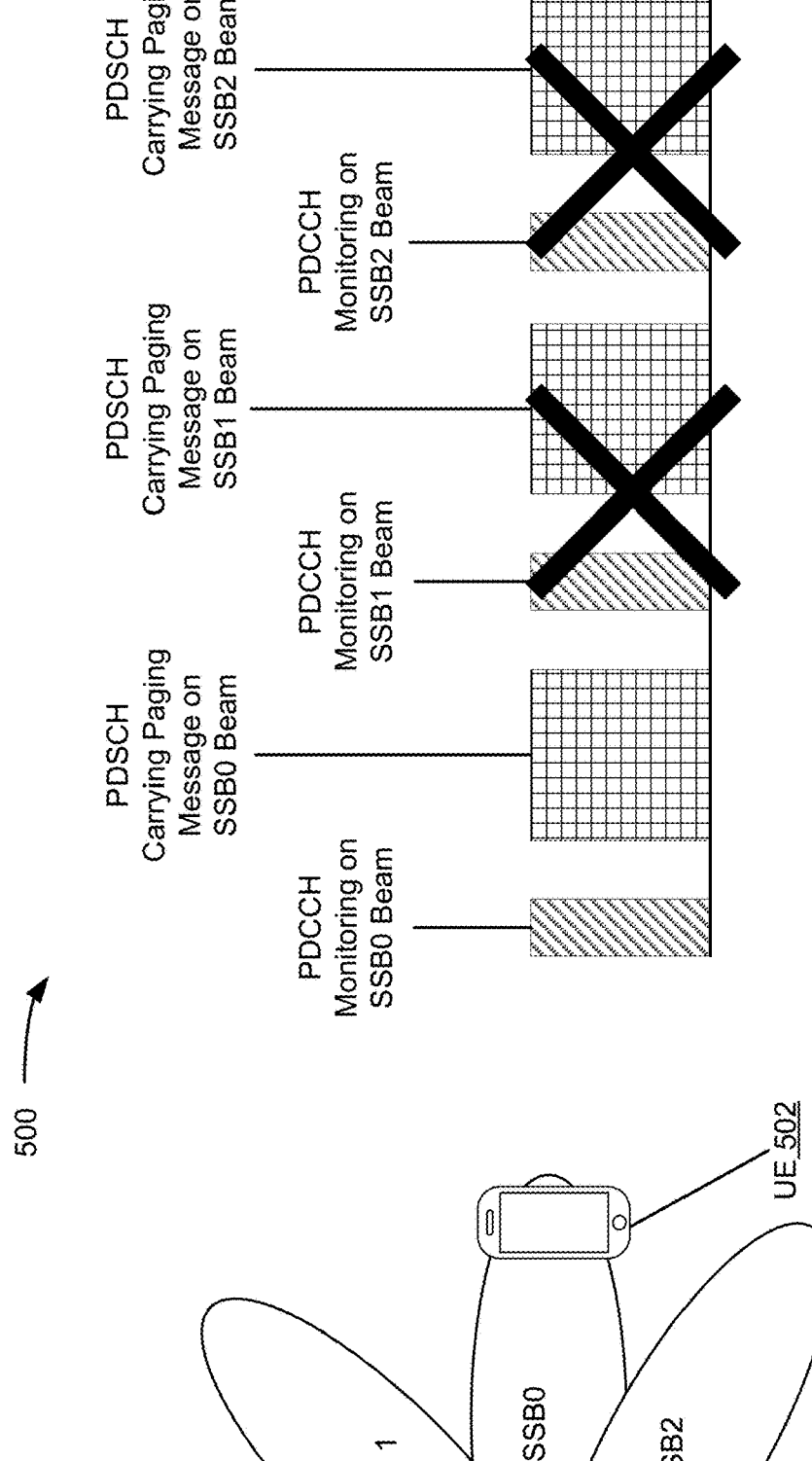
FIG. 5 illustrates an example of a timing diagram for receiving paging occasions and paging messages on SSB beams, in accordance with some embodiments.

FIG. 5 illustrates an example of a timing diagram 500 for receiving paging occasions and paging messages on SSB beams, in accordance with some embodiments. As illustrated, a UE 502 (e.g., the UE 104 of FIG. 1) can receive paging occasions and paging messages transmitted from a network node (e.g., the gNB 108 of FIG. 1) on multiple SSB beams. Because of a direct beam coverage of one of the SSB beams, the coverage quality can be relatively high (e.g., as indicated by the SNR or RSRP measurement determined based on the SSB). Because of the relatively high quality, it may be sufficient for the UE 502 to monitor a paging occasion and decode a paging message on the single beam associated with this direct coverage.

Generally, in an idle mode, the UE 502 performs measurements on the SSBs received in the SSB beams to determine the best set of SSB beams. The SSB reception, measurements, and the SSB beam determinations can be repeated periodically in support of beam selection/reselection.

In the illustration of FIG. 5, the UE 502 is located within a coverage of a particular SSB beam (shown as SSB0 beam). Hence, SSB measurements on the particular SSB beam indicates a high coverage quality (e.g., the SNR and/or RSRP determined based on measurement on the SSB received on the SSB0 beam are larger than a measurement threshold). For this reason, the UE 502 need not wake up multiple times to receive multiple SSBs on the particular SSB beam. Instead, one SSB reception may be sufficient for good frequency and timing tracking.

In addition, the UE may receive a paging occasion and a paging message on each SSB beam. Similarly to FIG. 4, the paging occasion and paging message on each SSB beam are here illustrated as PDCCH monitoring on SSB0 beam and PDSCH carrying paging message on SSB0 beam, PDCCH monitoring on SSB1 beam and PDSCH carrying paging message on SSB1 beam and PDCCH monitoring on SSB2 beam and PDSCH carrying paging message on SSB2 beam.

Because the UE 502 is in the coverage of the SSB0 beam, it may be sufficient for the UE 502 to monitor the paging occasion on the SSB0 beam (e.g., by performing blind decoding in the search space of the PDCCH on the SSB0 beam) to determine whether a paging message is scheduled for the UE 502. If so, it may also be sufficient for the UE 502 to decode the paging message on the SSB0 beam (e.g., by decoding the resources of the PDSCH on the SSB0, where these resources carry the paging message information). It may not be necessary for the UE 502 to monitoring the paging occasion and/or decode the paging message on the SSB1 beam or the SSB2 beam, as illustrated with the two "X" marks on the timing diagram 500.

FIG. 6 illustrates another example of a timing diagram 600 for receiving paging occasions and paging messages on SSB beams, in accordance with some embodiments. As illustrated, a UE 602 (e.g., the UE 104 of FIG. 1) can receive paging occasions and paging messages transmitted from a network node (e.g., the gNB 108 of FIG. 1) on multiple SSB beams. Because of indirect beam coverage, the coverage quality can be relatively low (e.g., as indicated by the SNR or RSRP measurement determined based on the SSB). Because of the relatively low quality, it may be insufficient for the UE 502 to monitor a paging occasion and decode a paging message on a single beam. Instead here, the page monitoring and page receiving can be scheduled on at least two SSB beams.

In the illustration of FIG. 6, the UE 602 is not located within a coverage of a particular SSB beam. Instead, the UE 602 is located between the SSB coverages of multiple SSB beams (e.g., the UE 602 is shown as being located between the SSB0 beam and the SSB2 beam in FIG. 6). This can be due to the mobility of the UE 602. In this case, SSB measurements on each SSB beam may indicate a low coverage quality (e.g., the SNR and/or RSRP determined based on measurement on the SSB received on each SSB beam are smaller than a measurement threshold).

To deal with this situation, multiple options may exist. In a first option, the UE 602 can wake up multiple times to receive multiple SSBs on each SSB beam and improve its frequency and timing tracking. The UE 602 can then select the best SSB beam to then monitor the paging occasion and decode the paging message on the best SSB beam. In a second option, the UE 602 need not wake up multiple times. Instead, the UE 602 can take advantage of the paging occasion and paging message being the same on all the SSB beams. Under the second option, the UE 602 can monitor the paging occasion and decode the paging message on at least two SSB beams. The second option can improve the power consumption of the UE 602 relative to the first option and is further described in the present disclosure. In one example of this second option, the PDCCH monitoring and/or the PDSCH decoding for the paging can be carried out separately and independently over the at least two SSB beams. In a further example of this second option, soft decoding information from a PDSCH decoding on one of the at least two beams can be used in a PDSCH decoding on another one of the at least two SSB beams. For instance, combining log-likelihood ratio (LLR) information from a current PDSCH reception and from previous PDSCH receptions for PDCSH decoding further improves the possible of a decoding success (e.g., a cyclic redundancy check (CRC) pass)).

Similarly to FIG. 4, the paging occasion and paging message on each SSB beam are here illustrated as PDCCH monitoring on SSB0 beam and PDSCH carrying paging message on SSB0 beam, PDCCH monitoring on SSB1 beam and PDSCH carrying paging message on SSB1 beam, and PDCCH monitoring on SSB2 beam and PDSCH carrying paging message on SSB2 beam. Because the UE 602 is not in a direct coverage (e.g., unlike the illustration of FIG. 5), the UE 602 is operating under low SNR and/or RSRP conditions, which can be detected by the UE 602 through SSB measurement. As such, the PDCCH monitoring and/or the PDSCH decoding for the paging can be carried out separately and independently over multiple SSB beams or by combining LLRs over the multiple SSB beams. Also because the UE 602 is located between the coverage of the SSB0 beam and the SSB2 beam, the SSB1 beam is a much weaker beam than these two SSB beams. In this case, the weaker SSB beams or undetected SSB beams (e.g., such as the SSB1 beam) can be eliminated from the PDCCH monitoring and/or the PDSCH decoding over the multiple SSB beams. As illustrated with the "X" mark in the timing diagram 600, the PDCCH monitoring and/or the PDSCH decoding are performed on the SSB0 beam and the SSB2 beam but not the SSB1 beam. The paging message is successfully received as long as one of the PDSCHs can be successfully decoded.

As such, the need for multiple wake-ups to receive an SSB can be lowered by improving the decoding success rate with multiple decoding efforts. This translated to lowering the current consumption of the UE 602. The impact associated with receiving on a second SSB beam can be mitigated by triggering a second receive on this SSB beam when the PDSCH decoding based on reception on a first SSB beam fails. These and other functionalities are further described in the next figures.

FIG. 7 illustrates an example of an operational flow/algorithmic structure 700 for scheduling page monitoring and page receiving, in accordance with some embodiments. Generally, a UE (e.g., the UE 104 of FIG. 1) can support a paging mechanism on multiple SSB beams, where a base station (e.g., the gNB 108) or, more generally, a network can transmit SSBs, paging occasions, and paging message to the UE on the multiple SSB beams. The UE 104 can be, for example, the UE 104, the UE 1600, or the operational flow/algorithmic structure 700 can even be implemented by components of the UE, such as by processors 1604.

The operation flow/algorithmic structure 700 may include, at 702, receiving, during an active state of a DRX cycle, a plurality of SSBs that respectively correspond to a plurality of beams of a base station. For example, the UE is operating in an idle mode and enters a sleep state (e.g., a deep sleep state) of the DRX cycle. The UE then wakes up during a time window within the DRX cycle (e.g., during an SMTC cycle) to receive an SSB on each SSB beam. The UE need not wake up multiple times to receive multiple SSBs on each SSB beam.

The operation flow/algorithmic structure 700 may include, at 704, determining a plurality of measurements that respectively correspond to the plurality of SSBs. For example, the UE performs an SSB measurement per SSB received on each SSB beam. Based on these measurements, the UE can determine the SNR and/or RSRP per SSB beam.

The operation flow/algorithmic structure 700 may include, at 706, selecting a first measurement from the plurality of measurements. For example, the UE selects the best SSB measurement, such as the largest SNR or the largest RSRP. This best measurement is associated with particular SSB beam, which can be referred to as the best SSB beam.

The operation flow/algorithmic structure 700 may include, at 708, comparing the first measurement of the plurality of measurements to a measurement threshold. For example, the measurement threshold includes an SSB measurement threshold (e.g., an SNR threshold and/or an RSRP threshold). The SSB measurement threshold can be pre-stored in a memory of the UE and can be defined, for instance, in a technical specification with which the UE is compatible and compliant. The comparison can indicate that the first measurement (e.g., the best SSB measurement) indicates an indirect SSB beam coverage (e.g., a low SNR condition and/or a low RSRP condition). This can be the case when the SSB measurement is lower than the SSB measurement threshold.

The operation flow/algorithmic structure 700 may include, at 710, scheduling, based on said comparing, page monitoring, and page receiving on at least two beams of the plurality of beams. For example, because of the indirect SSB beam coverage, the UE can schedule (e.g., based on an RRC configuration) the performing of blind decoding of a search space of a PDCCH on at least two SSB beams. If this decoding (e.g., decoded DCI) indicates that a paging message is scheduled, the UE can schedule the decoding of resources of a PDSCH on the at least two SSB beams, where these resources are determined based on the DCI-indicated schedule.

In case when, at 808, the first measurement indicates a direct beam coverage (e.g., a good SNR condition and/or a good RSRP condition, whereby the SSB measurement is greater than the SSB measurement threshold), the page monitoring and the page receiving need not be performed on multiple SSB beams. Instead, the page monitoring and the page receiving may be scheduled on the best SSB beam.

Figure 8:
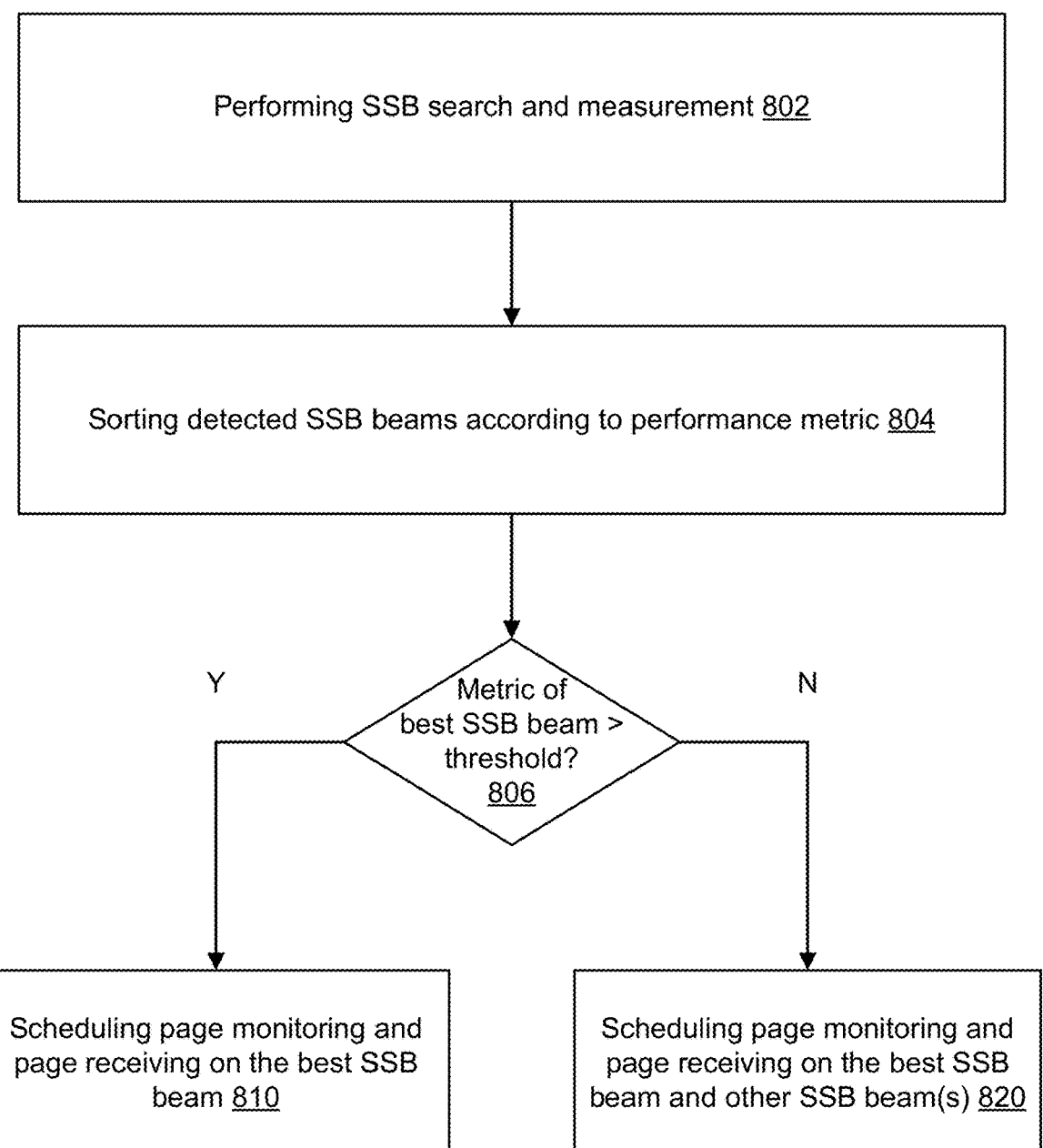
FIG. 8 illustrates another example of an operational flow/algorithmic structure for scheduling page monitoring and page receiving based on SSB measurements, in accordance with some embodiments.

FIG. 8 illustrates another example of an operational flow/algorithmic structure 800 for scheduling page monitoring and page receiving based on SSB measurements, in accordance with some embodiments. The operational flow/algorithmic structure 800 can be an example of a more detailed implementation of the operational flow/algorithmic structure 700 of FIG. 7.

The operation flow/algorithmic structure 800 may include, at 802, performing SSB search and measurement. For example, the base station sends SSBs periodically on each SSB beam. The UE can wake up, during a DRX cycle, to receive an SSB on each SSB beam and perform an SSB measurement on each received SSB. As explained herein above, the UE need not wake up multiple times during the DRX cycle to receive multiple SSBs on each SSB beam. Instead, the reception of a single SSB per SSB beam may be sufficient.

The operation flow/algorithmic structure 800 may include, at 804, sorting detected SSB beams according to performance metric. For example, a performance metric can be defined for and associated with each detected SSB beam. The performance metric of an SSB beam can include the SSB measurement, such as the SNR and/or RSRP, determined from the SSB transmitted on the SSB beam. The SSB beams can be sorted in a descending orders depending on their respective SSB measurements to determine the best beam (e.g., the highest sorted SSB beam), the next best beam (e.g., the next highest sorted SSB beam), and so on.

The operation flow/algorithmic structure 800 may include, at 806, determining whether the performance metric of the best SSB beam is larger than a threshold. For example, the threshold includes an SSB measurement threshold (e.g., an SNR threshold and/or an RSRP threshold). The SSB measurement threshold can be pre-stored in a memory of the UE and can be defined, for instance, in a technical specification with which the UE is compatible and compliant. If the performance metric is larger than the threshold, the UE can determine that it is in a direct beam coverage. Accordingly, operation 810 follows operation 806 (as indicated with a "Y" above the arrow). Otherwise, operation 820 follows operation 806 (as indicated with a "N" above the arrow).

The operation flow/algorithmic structure 800 may include, at 810, scheduling page monitoring and page receiving on the best SSB beam. For example, because of the direct beam coverage, it may be sufficient for the UE to perform PDCCH monitoring and PDSCH decoding for paging on only the best SSB beam. In this case, the UE can schedule (e.g., based on an RRC configuration) to perform blind decoding of a search space of a PDCCH on the best SSB beam. If this decoding (e.g., decoded DCI) indicates that a paging message is scheduled, the UE can schedule the decoding of resources of a PDSCH on the also the best SSB beam, where these resources are determined based on the DCI-indicated schedule.

The operation flow/algorithmic structure 800 may include, at 820, scheduling page monitoring and page receiving on the best SSB beam and other SSB beam(s). For example, the page monitoring can be performed on at least two SSB beams that include the best SSB beam or on all detected SSB beams. Because of the indirect SSB beam coverage, the UE can schedule (e.g., based on an RRC configuration) the performing of blind decoding of a search space of a PDCCH on the at least two SSB beams or all detected SSB beams. If this decoding (e.g., decoded DCI) indicates that a paging message is scheduled, the UE can schedule the decoding of resources of a PDSCH on the at least two SSB beams or all detected SSB beams, where these resources are determined based on the DCI-indicated schedule.

Figure 9:
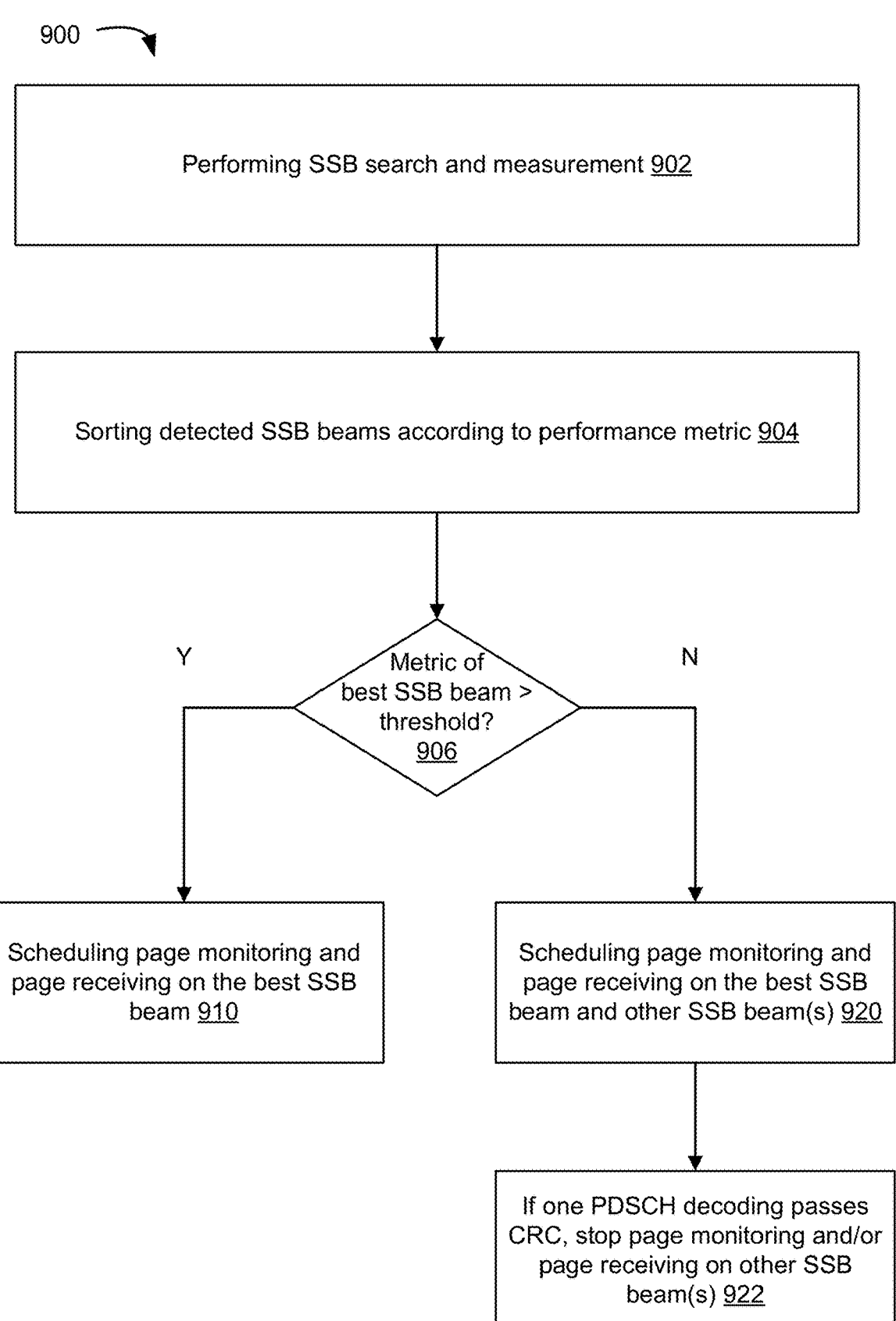
FIG. 9 illustrates another example of an operational flow/algorithmic structure for scheduling page monitoring and page receiving based on decoding failures and successes, in accordance with some embodiments.

FIG. 9 illustrates another example of an operational flow/algorithmic structure 900 for scheduling page monitoring and page receiving based on decoding failures and successes, in accordance with some embodiments. The operational flow/algorithmic structure 900 can be an example of a more detailed implementation of the operational flow/algorithmic structure 700 of FIG. 7. Some aspects of the operational flow/algorithmic structure 900 are similar to corresponding ones of the operational flow/algorithmic structure 800. Similarities are not repeated herein in the interest of brevity of explanation. In particular, the UE can schedule page monitoring and page receiving on at least two SSBs (e.g., in the case of indirect beam coverage), as in the operational flow/algorithmic structure 800. However, if the PDSCH decoding succeeds on one of the SSB beams, the PDCCH monitoring and/or PDSCH decoding on a remaining SSB beam(s) of the at least two SSB beams can be stopped.

The operation flow/algorithmic structure 900 may include, at 902, performing SSB search and measurement. The operation flow/algorithmic structure 900 may include, at 904, sorting detected SSB beams according to performance metric. The operation flow/algorithmic structure 900 may include, at 906, determining whether the performance metric of the best SSB beam is larger than a threshold. If so operation 910 follows operation 906 (as indicated with a "Y" above the arrow). Otherwise, operation 920 follows operation 906 (as indicated with a "N" above the arrow). The operation flow/algorithmic structure 900 may include, at 910, scheduling page monitoring and page receiving on the best SSB beam. The operation flow/algorithmic structure 900 may include, at 920, scheduling page monitoring and page receiving on the best SSB beam and other SSB beam(s).

The operation flow/algorithmic structure 900 may include, at 922, stopping page monitoring and/or page receiving on other SSB beam(s) if one PDSCH decoding passes CRC. For example, the UE can successfully decode the paging message carried in resources of a PDSCH on one of the SSB beams. The decoding success can be determined based on the CRC pass. In this case, no additional information can be gained by decoding the paging message on resource elements of another PDSCH on another SSB beam. In this case, the scheduling of the PDSCH decoding on the other SSB beam (or multiple remaining ones that have not been decoded) can be stopped. Likewise, if PDCCH monitoring has not been performed on a remaining one of the SSB beams, this PDCCH monitoring can also be stopped.

FIG. 10 illustrates another example of an operational flow/algorithmic structure 1000 for scheduling page monitoring and page receiving based on a subset of SSB beams, in accordance with some embodiments. The operational flow/algorithmic structure 1000 can be an example of a more detailed implementation of the operational flow/algorithmic structure 700 of FIG. 7. Some aspects of the operational flow/algorithmic structure 1000 are similar to corresponding ones of the operational flow/algorithmic structures 800-900. Similarities are not repeated herein in the interest of brevity of explanation. In particular, the UE can schedule page monitoring and page receiving on at least two SSBs (e.g., in the case of indirect beam coverage), as in the operational flow/algorithmic structure 800 or 900. However, rather than doing so on all of the detected SSB beams, a subset of the SSB beams is used.

The operation flow/algorithmic structure 1000 may include, at 1002, performing SSB search and measurement. The operation flow/algorithmic structure 1000 may include, at 1004, sorting detected SSB beams according to performance metric. The operation flow/algorithmic structure 1000 may include, at 1006, determining whether the performance metric of the best SSB beam is larger than a threshold (e.g., a first threshold). If so, operation 1010 follows operation 1006 (as indicated with a "Y" above the arrow). Otherwise, operation 1018 follows operation 1006 (as indicated with a "N" above the arrow). The operation flow/algorithmic structure 1000 may include, at 1010, scheduling page monitoring and page receiving on the best SSB beam.

The operation flow/algorithmic structure 1000 may include, at 1018, selecting SSB beam(s) each having a metric that is larger than or equal to another threshold (e.g., a second threshold, shown in FIG. 10 as Threshold_Low). In an example, the second threshold is smaller than the first threshold used at operation 1006. The second threshold can also be an SSB measurement threshold (e.g., an SNR threshold and/or an RSRP threshold). This SSB measurement threshold can be pre-stored in a memory of the UE and can be defined, for instance, in a technical specification with which the UE is compatible and compliant. As such, only the subset of SSB beams that each has an SSB measurement larger than this second threshold are selected. Remaining SSB beams are not selected. By using a subset of the detected SSB beams, the processing to support the PDCCH monitoring and the PDSCH decoding can be reduced.

The operation flow/algorithmic structure 1000 may include, at 1020, scheduling page monitoring and page receiving on the best SSB beam and other SSB beam(s) (e.g., these beams belong to the subset). The operation flow/algorithmic structure 1000 may include, at 1022, stopping page monitoring and/or page receiving on other SSB beam(s) if one PDSCH decoding passes CRC.

Figure 11:
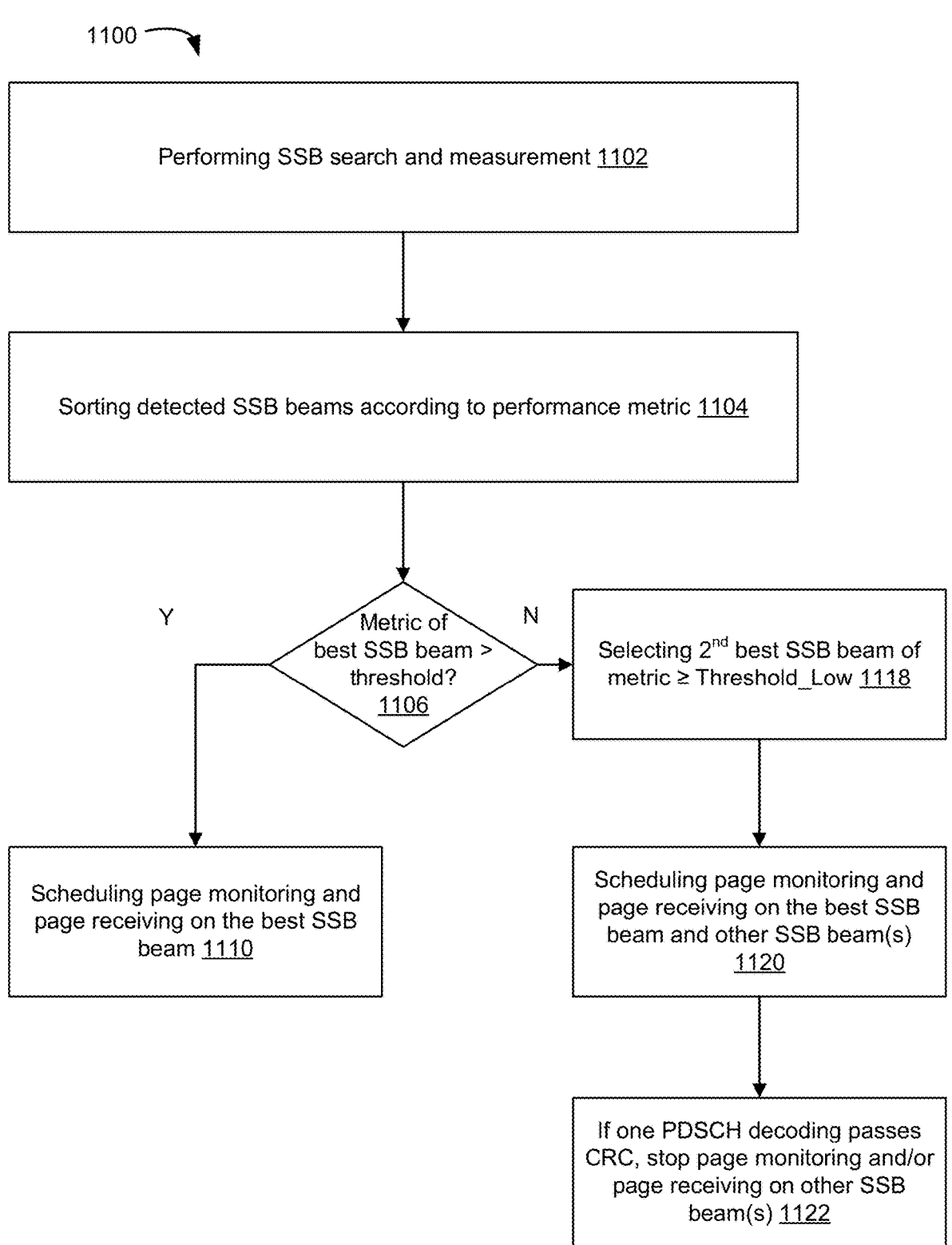
FIG. 11 illustrates another example of an operational flow/algorithmic structure for scheduling page monitoring and page receiving based on the highest ranked SSB beams, in accordance with some embodiments.

FIG. 11 illustrates another example of an operational flow/algorithmic structure 1100 for scheduling page monitoring and page receiving based on the highest ranked SSB beams, in accordance with some embodiments. The operational flow/algorithmic structure 1100 can be an example of a more detailed implementation of the operational flow/algorithmic structure 700 of FIG. 7. Some aspects of the operational flow/algorithmic structure 1100 are similar to corresponding ones of the operational flow/algorithmic structures 800-1000. Similarities are not repeated herein in the interest of brevity of explanation. In particular, the UE can schedule page monitoring and page receiving on at least two SSBs (e.g., in the case of indirect beam coverage), as in the operational flow/algorithmic structure 800, 900, or 1000. However, this scheduling can be limited to the best SSB beam, and the next best SSB beam because the PDSCH decoding has the best likelihood of success on these two SSB beams and further PDSCH decoding on remaining SSB beams may not be needed or is omitted for the ease of implementation.

The operation flow/algorithmic structure 1100 may include, at 1102, performing SSB search and measurement. The operation flow/algorithmic structure 1100 may include, at 1004, sorting detected SSB beams according to performance metric. The operation flow/algorithmic structure 1100 may include, at 1106, determining whether the performance metric of the best SSB beam is larger than a threshold (e.g., a first threshold). If so operation 1110 follows operation 1106 (as indicated with a "Y" above the arrow). Otherwise, operation 1118 follows operation 1106 (as indicated with a "N" above the arrow). The operation flow/algorithmic structure 1000 may include, at 1110, scheduling page monitoring and page receiving on the best SSB beam.

The operation flow/algorithmic structure 1100 may include, at 1118, selecting the second best SSB beam(s) having a metric that is larger than or equal to another threshold (e.g., a second threshold, shown in FIG. 11 as Threshold_Low). This operation can be similar to the operation 1018 of the operation flow/algorithmic structure 1000 except that the selected subset is limited to the best and second best SSB beams.

The operation flow/algorithmic structure 1000 may include, at 1020, scheduling page monitoring and page receiving on the best SSB beam and other SSB beam(s) (e.g., these beams belong to the subset). The operation flow/algorithmic structure 1000 may include, at 1022, stopping page monitoring and/or page receiving on other SSB beam(s) if one PDSCH decoding passes CRC.

Figure 12:
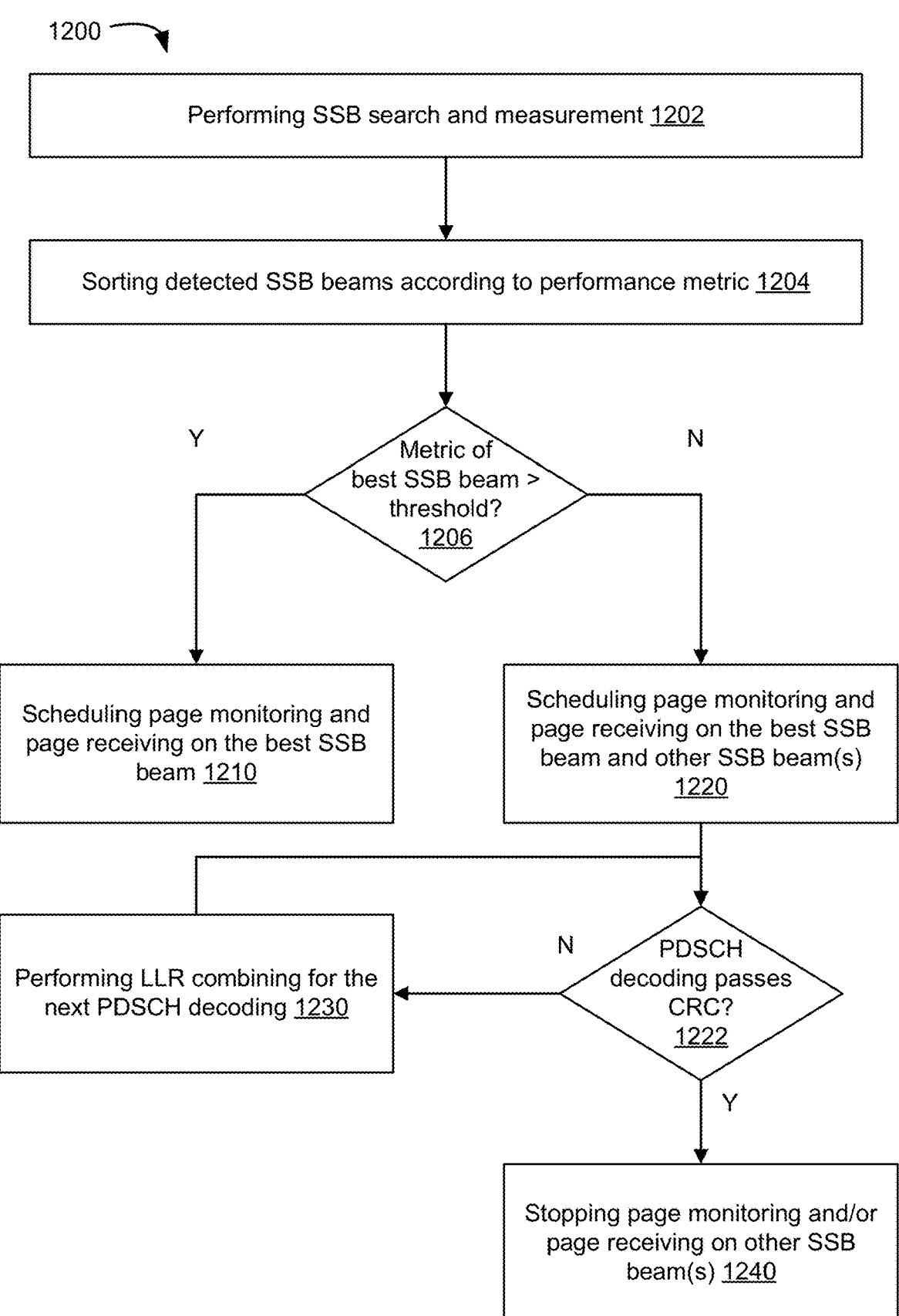
FIG. 12 illustrates another example of an operational flow/algorithmic structure for scheduling page monitoring and page receiving based on combining soft decoding information, in accordance with some embodiments.

FIG. 12 illustrates another example of an operational flow/algorithmic structure 1200 for scheduling page monitoring and page receiving based on combining soft decoding information, in accordance with some embodiments. The operational flow/algorithmic structure 1200 can be an example of a more detailed implementation of the operational flow/algorithmic structure 700 of FIG. 7. Some aspects of the operational flow/algorithmic structure 1200 are similar to corresponding ones of the operational flow/algorithmic structures 800-900. Similarities are not repeated herein in the interest of brevity of explanation. In particular, the UE can schedule page monitoring and page receiving on at least two SSBs (e.g., in the case of indirect beam coverage), as in the operational flow/algorithmic structure 800 or 900. However, rather than performing independent decoding on each SSB beam, soft decoding information, such as LLR information, that is output from the PDSCH decoding on one SSB beam can be used in the PDSCH decoding on another SSB beam. In this way, the soft decoding information can be combined in the PDSCH decoding across the multiple beams.

The operation flow/algorithmic structure 1200 may include, at 1202, performing SSB search and measurement. The operation flow/algorithmic structure 1200 may include, at 1204, sorting detected SSB beams according to performance metric. The operation flow/algorithmic structure 1200 may include, at 1206, determining whether the performance metric of the best SSB beam is larger than a threshold (e.g., a first threshold). If so operation 1210 follows operation 1206 (as indicated with a "Y" above the arrow). Otherwise, operation 1220 follows operation 1206 (as indicated with a "N" above the arrow). The operation flow/algorithmic structure 1200 may include, at 1210, scheduling page monitoring and page receiving on the best SSB beam. The operation flow/algorithmic structure 1200 may include, at 1220, scheduling page monitoring and page receiving on the best SSB beam and other SSB beam(s) (e.g., these beams belong to the subset).

The operation flow/algorithmic structure 1200 may include, at 1222, determining whether the PDSCH decoding passes CRC. For example, each time decoding is performed for a PDSCH, the decoded CRC is checked to determine whether a decoding success or a decoding failure occurred. The decoding success corresponds to a CRC pass. Otherwise, the decoding failure is determined. If the decoding failure is determined, operation 1230 follows operation 1222 (as indicated with a "N" above the arrow). Otherwise, operation 1240 follows operation 1222 (as indicated with a "Y" above the arrow).

The operation flow/algorithmic structure 1200 may include, at 1230, performing LLR combining for the next PDSCH decoding. For example, the PDSCH decoding uses quasi-cyclic low-density parity-check (QC-LDPC) decoding. The QC-LDPC decoding is performed per paging message on an SSB beam. LLR information is used in this decoding. Further, this LLR information is used as the soft decoding information to start the next QC-LDPC decoding of the paging message on the next SSB beam (e.g., the LLR information of the next QC-LDPC decoding is initialized to the LLR information of the previous QC-LDPC decoding). Likewise, if the next decoding also results in a CRC failure, the LLR information available from this decoding and, optionally, from the previous decoding, can be used as the soft decoding information to start the next QC-LDPC decoding of the paging message on the further next SSB beam, and so on.

The operation flow/algorithmic structure 1200 may include, at 1240, stopping page monitoring and/or page receiving on other SSB beam(s).

FIG. 13 illustrates another example of an operational flow/algorithmic structure 1300 for scheduling page monitoring and page receiving based on a subset of SSB beams and on combining soft decoding information, in accordance with some embodiments. The operational flow/algorithmic structure 1300 can be an example of a more detailed implementation of the operational flow/algorithmic structure 700 of FIG. 7. Some aspects of the operational flow/algorithmic structure 1300 are similar to corresponding ones of the operational flow/algorithmic structures 800, 1000, or 1200. Similarities are not repeated herein in the interest of brevity of explanation. In particular, the UE can schedule page monitoring and page receiving on at least two SSBs (e.g., in the case of indirect beam coverage), as in the operational flow/algorithmic structure 800. However, rather than performing independent decoding on each SSB beam, soft decoding information, such as LLR information, that is output from the PDSCH decoding on one SSB beam can be used in the PDSCH decoding on another SSB beam as in the operational flow/algorithmic structure 1200. However, rather than doing so on all of the detected SSB beams, a subset of the SSB beams is used as in the operational flow/algorithmic structure 1000.

The operation flow/algorithmic structure 1300 may include, at 1302, performing SSB search and measurement. The operation flow/algorithmic structure 1300 may include, at 1304, sorting detected SSB beams according to performance metric. The operation flow/algorithmic structure 1300 may include, at 1306, determining whether the performance metric of the best SSB beam is larger than a threshold (e.g., a first threshold). If so, operation 1310 follows operation 1306 (as indicated with a "Y" above the arrow). Otherwise, operation 1318 follows operation 1306 (as indicated with a "N" above the arrow). The operation flow/algorithmic structure 1300 may include, at 1310, scheduling page monitoring and page receiving on the best SSB beam.

The operation flow/algorithmic structure 1300 may include, at 1318, selecting SSB beam(s) each having a metric that is larger than or equal to another threshold (e.g., a second threshold, shown in FIG. 13 as Threshold_Low). The operation flow/algorithmic structure 1300 may include, at 1320, scheduling page monitoring and page receiving on the best SSB beam and other SSB beam(s) (e.g., these beams belong to the subset). The operation flow/algorithmic structure 1300 may include, at 1322, determining whether the PDSCH decoding passes CRC. If the decoding failure is determined, operation 1330 follows operation 1322 (as indicated with a "N" above the arrow). Otherwise, operation 1340 follows operation 1322 (as indicated with a "Y" above the arrow).

The operation flow/algorithmic structure 1300 may include, at 1330, performing LLR combining for the next PDSCH decoding. The operation flow/algorithmic structure 1300 may include, at 1340, stopping page monitoring and/or page receiving on other SSB beam(s).

FIG. 14 illustrates another example of an operational flow/algorithmic structure for scheduling page monitoring and page receiving based on the highest ranked SSB beams and on combining soft decoding information, in accordance with some embodiments. The operational flow/algorithmic structure 1400 can be an example of a more detailed implementation of the operational flow/algorithmic structure 700 of FIG. 7. Some aspects of the operational flow/algorithmic structure 1400 are similar to corresponding ones of the operational flow/algorithmic structures 800-1300. Similarities are not repeated herein in the interest of brevity of explanation. In particular, the UE can schedule page monitoring and page receiving on at least two SSBs (e.g., in the case of indirect beam coverage), as in the operational flow/algorithmic structure 800, 1100, or 1200. However, rather than performing independent decoding on each SSB beam, soft decoding information, such as LLR information, that is output from the PDSCH decoding on one SSB beam can be used in the PDSCH decoding on another SSB beam as in the operational flow/algorithmic structure 1200. However, rather than doing so on all of the detected SSB beams, the best and next best SSB beams are used as in the operational flow/algorithmic structure 1100.

The operation flow/algorithmic structure 1400 may include, at 1402, performing SSB search and measurement. The operation flow/algorithmic structure 1400 may include, at 1404, sorting detected SSB beams according to performance metric. The operation flow/algorithmic structure 1400 may include, at 1406, determining whether the performance metric of the best SSB beam is larger than a threshold (e.g., a first threshold). If so, operation 1410 follows operation 1406 (as indicated with a "Y" above the arrow). Otherwise, operation 1418 follows operation 1406 (as indicated with a "N" above the arrow). The operation flow/algorithmic structure 1400 may include, at 1410, scheduling page monitoring and page receiving on the best SSB beam.

The operation flow/algorithmic structure 1400 may include, at 1418, selecting the second best SSB beam(s) having a metric that is larger than or equal to another threshold (e.g., a second threshold, shown in FIG. 11 as Threshold_Low). The operation flow/algorithmic structure 1400 may include, at 1420, scheduling page monitoring and page receiving on the best SSB beam and other SSB beam(s) (e.g., these beams belong to the subset). The operation flow/algorithmic structure 1400 may include at 1422, determining whether the PDSCH decoding passes CRC. If the decoding failure is determined, operation 1430 follows operation 1422 (as indicated with a "N" above the arrow). Otherwise, operation 1440 follows operation 1422 (as indicated with a "Y" above the arrow).

The operation flow/algorithmic structure 1400 may include, at 1340, performing LLR combining for the next PDSCH decoding. The operation flow/algorithmic structure 1400 may include, at 1440, stopping page monitoring and/or page receiving on other SSB beam(s).

In some or all of the above operation flow/algorithmic structures, one or more additional or alternative criteria can be used to schedule and/or stop the page monitoring and/or the page receiving. Examples of such criteria include the relative strength/weakness (e.g., as indicated by the performance metric-based sorting), the timing of a paging occasion, and the timing of a paging message.

In an example of using the above criteria, if a PDCCH monitoring occasion (e.g., an example of a paging occasion) on a weaker SSB beam arrives first, the UE needs to attempt to decode the DCI on this SSB beam preemptively in order not to miss the potentially needed combining of LLR information determined from the scheduled, as applicable, PDSCH decoding with the PDSCH decoding on another SSB beam. To illustrate, and referring to the timing diagram 400 of FIG. 4, assume that the SSB0 beam is weaker than the SSB1 beam. In this case, the UE does not forego the page monitoring and the page receiving on the SSB0 beam. Instead, they are performed on SSB0 beam and if the decoding of the paging message fails (e.g., does not pass CRC), the LLR information of the page messaging decoding can be subsequently used in the PDSCH decoding of the page message on the SSB1 beam.

In another example of using the above criteria, if a PDCCH monitoring occasion on the strongest beam (e.g., best SSB beam, or more generally a relatively stronger SSB beam) comes first and a DCI is detected, the UE can further compare the arrival times of the PDCCH monitoring occasion and the PDSCH decoding on a weaker beam. Based on this comparison, one of two behaviors can be followed. In a first behavior, if a PDCCH monitoring occasion on the weaker SSB beam comes earlier than the scheduled PDSCH decoding on the stronger/strongest beam, the UE schedules the PDCCH monitoring on the weaker SSB beam preemptively to prepare for possible PDSCH decoding on the weaker SSB beam (e.g., in case the PDSCH decoding on the stronger/strongest SSB beam does not pass the CRC). In a second behavior, if the PDCCH monitoring occasion on the weaker SSB beam comes later than the scheduled PDSCH decoding on the stronger/strongest beam, the UE schedules PDCCH monitoring on the weaker SSB beam only when PDSCH decoding on the stronger/strongest SSB beam has failed (e.g., does not pass the CRC).

To illustrate, and referring to the timing diagram 400 of FIG. 4, assume that the SSB0 beam is stronger than the SSB1 beam. In this case, the UE has detected a DCI on the SSB0 beam scheduling PDSCH decoding on the SSB0 beam. In an illustration of the first behavior, assume that the PDCCH monitoring on the SSB1 beam comes earlier than this scheduled PDSCH decoding on the SSB0 beam. In this case, the UE performs the PDCCH monitoring on the SSB1 beam to determine the schedule of the PDSCH decoding on also the SSB1 beam. Only if the PDSCH decoding on the SSB0 beam fails, does the UE perform the PDSCH decoding on the SSB1 beam. In an illustration of the second behavior, assume that the PDCCH monitoring on the SSB1 beam comes later than the scheduled PDSCH decoding on the SSB0 beam. In this case, only if the PDSCH decoding on the SSB0 beam fails, does the UE performs the PDCCH monitoring on the SSB1 beam.

In an example of using the above criteria, if a PDSCH decoding on a weaker SSB beam is scheduled for after that on a stronger SSB beam, a second decoding attempt (e.g., the PDSCH decoding on the weaker SSB beams) with LLR combining is scheduled only after CRC fails in the first attempt (e.g., the PDSCH decoding on the stronger beam). To illustrate, and referring to the timing diagram 400 of FIG. 4, assume that the SSB0 beam is stronger than the SSB1 beam. Also assume that the PDSCH decoding on SSB0 beam is scheduled to occur prior to PDSCH decoding on the SSB1 beam. In this case, the UE does not forego the page monitoring and the page receiving on the SSB0 beam. Instead, only after the PDSCH decoding on the SSB0 beam fails, does the UE performs the PDSCH decoding on the SSB1 beam, and this subsequent PDSCH decoding on the SSB1 beam uses the LLR information from the earlier failed PDSCH decoding on the SSB0 beam.

Figure 15:
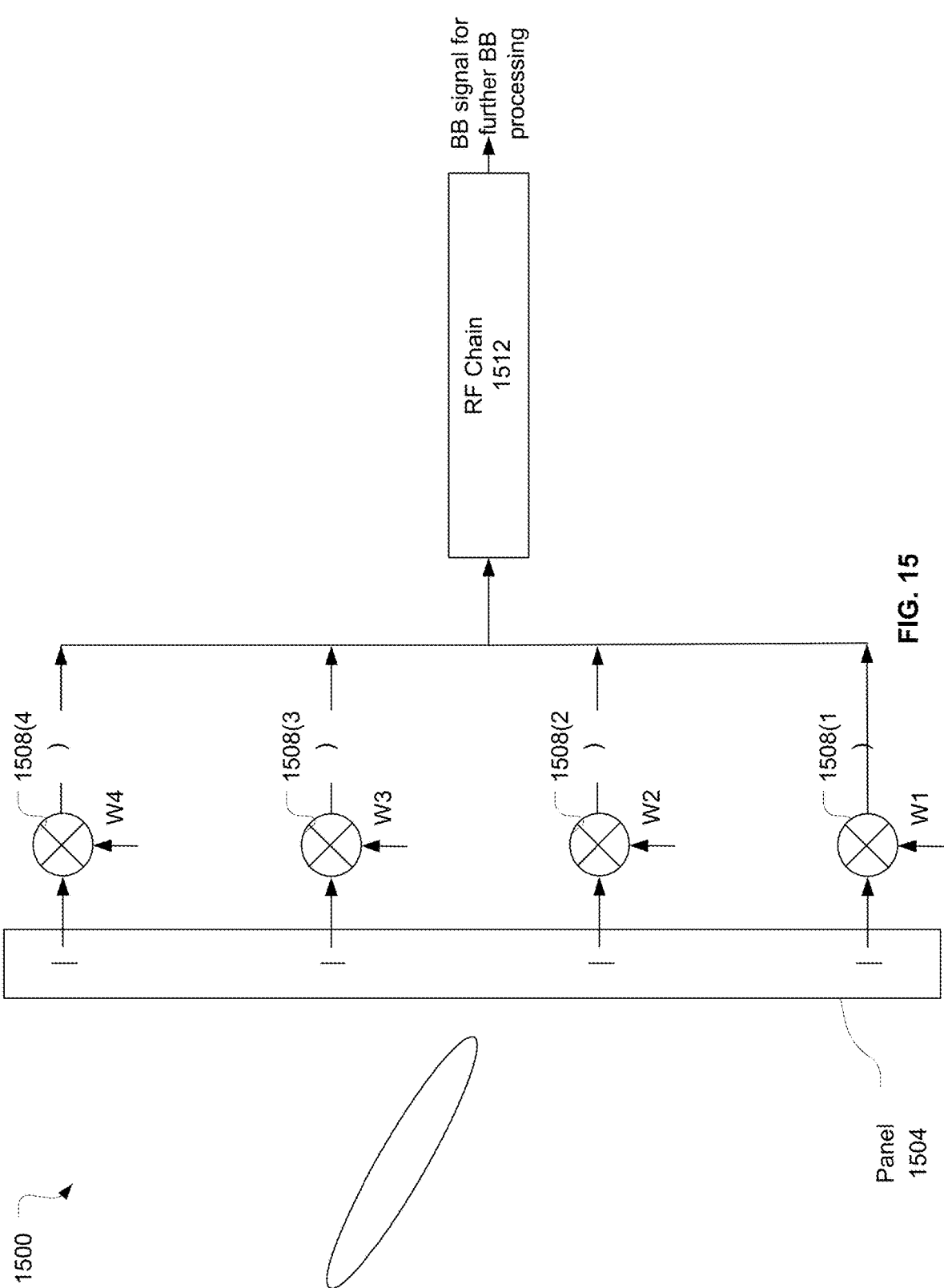
FIG. 15 illustrates an example of receive components, in accordance with some embodiments.

FIG. 15 illustrates receive components 1500 of the UE 104, in accordance with some embodiments. The receive components 1500 may include an antenna panel 1504 that includes a number of antenna elements. The panel 1504 is shown with four antenna elements, but other embodiments may include other numbers.

The antenna panel 1504 may be coupled to analog beamforming (BF) components that include a number of phase shifters 1508(1)-1508(4). The phase shifters 1508(1)-1508(4) may be coupled with a radio-frequency (RF) chain 1512. The RF chain 1512 may amplify a receive analog RF signal, down convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values to the phase shifters 1508(1)-1508(4) to provide a receive beam at the antenna panel 1504. These BF weights may be determined based on the channel-based beamforming.

Figure 16:
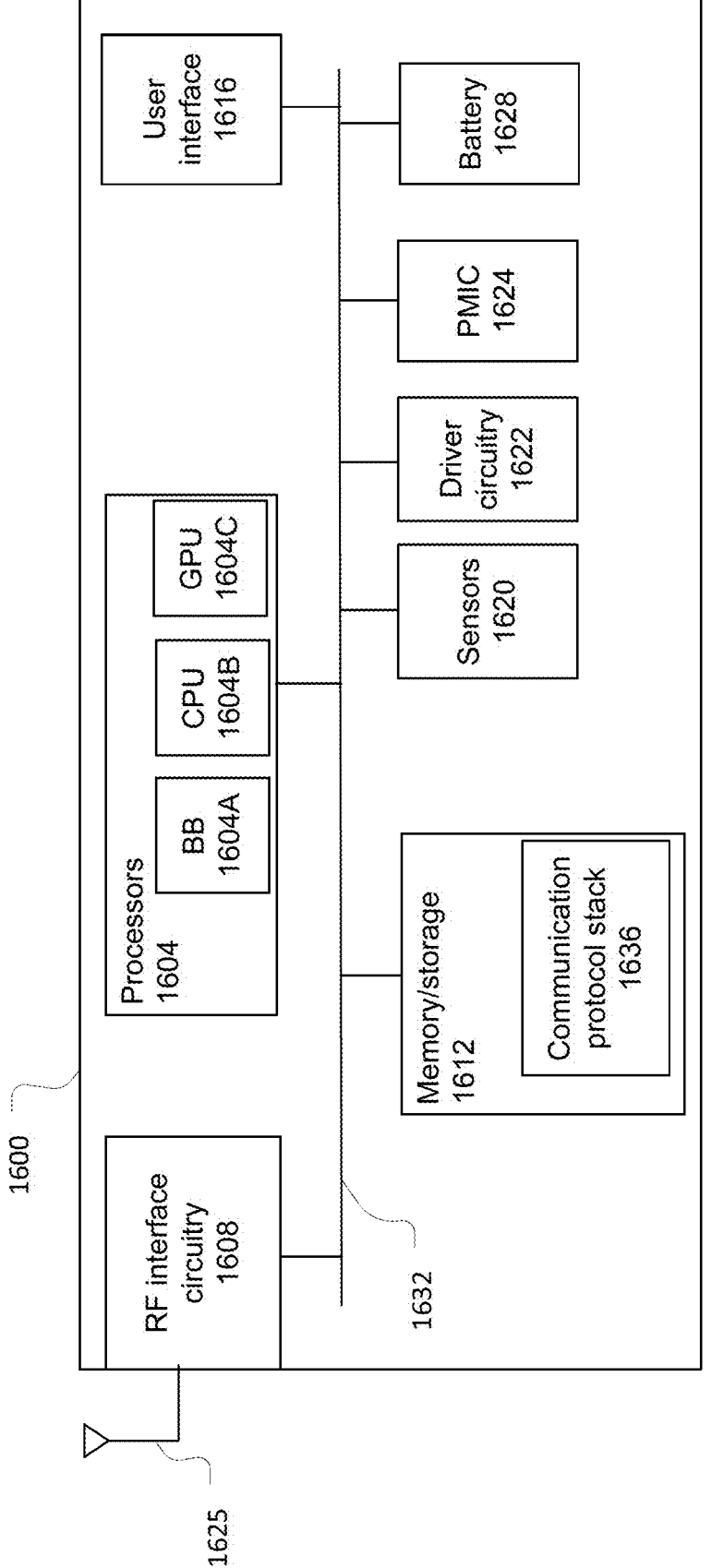
FIG. 16 illustrates an example of a UE, in accordance with some embodiments.

FIG. 16 illustrates a UE 1600, in accordance with some embodiments. The UE 1600 may be similar to and substantially interchangeable with UE 104 of FIG. 1.

Similar to that described above with respect to UE 104, the UE 1600 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (for example, cameras and video cameras), wearable devices, or relaxed-IoT devices. In some embodiments, the UE may be a reduced capacity UE or NR-Light UE.

The UE 1600 may include processors 1604, RF interface circuitry 1608, memory/storage 1612, user interface 1616, sensors 1620, driver circuitry 1622, power management integrated circuit (PMIC) 1624, and battery 1628. The components of the UE 1600 may be implemented as integrated circuits (ICs), portions thereof, discrete electronic devices, or other modules, such as logic, hardware, software, firmware, or a combination thereof. The block diagram of FIG. 16 is intended to show a high-level view of some of the components of the UE 1600. However, some of the components shown may be omitted, additional components may be present, and different arrangements of the components shown may occur in other implementations.

The components of the UE 1600 may be coupled with various other components over one or more interconnects 1632 which may represent any type of interface, input/output, bus (local, system, or expansion), transmission line, trace, optical connection, etc. that allows various circuit components (on common or different chips or chipsets) to interact with one another.

The processors 1604 may include processor circuitry, such as baseband processor circuitry (BB) 1604A, central processor unit circuitry (CPU) 1604B, and graphics processor unit circuitry (GPU) 1604C. The processors 1604 may include any type of circuitry or processor circuitry that executes or otherwise operates computer-executable instructions, such as program code, software modules, or functional processes from memory/storage 1612 to cause the UE 1600 to perform operations as described herein.

In some embodiments, the baseband processor circuitry 1604A may access a communication protocol stack 1636 in the memory/storage 1612 to communicate over a 3GPP compatible network. In general, the baseband processor circuitry 1604A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1608.

The baseband processor circuitry 1604A may generate or process baseband signals or waveforms that carry information in 3GPP-compatible networks. In some embodiments, the waveforms for NR may be based on cyclic prefix OFDM (CP-OFDM) in the uplink or downlink and discrete Fourier transform spread OFDM (DFT-S-OFDM) in the uplink.

The baseband processor circuitry 1604A may also access group information from memory/storage 1612 to determine search space groups in which a number of repetitions of a PDCCH may be transmitted.

The memory/storage 1612 may include any type of volatile or non-volatile memory that may be distributed throughout the UE 1600. In some embodiments, some of the memory/storage 1612 may be located on the processors 1604 themselves (for example, L1 and L2 cache), while other memory/storage 1612 is external to the processors 1604 but accessible thereto via a memory interface. The memory/storage 1612 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1608 may include transceiver circuitry and a radio frequency front module (RFEM) that allows the UE 1600 to communicate with other devices over a radio access network. The RF interface circuitry 1608 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 1625 and proceed to filter and amplify (with a low-noise amplifier) the signal. The signal may be provided to a receiver of the transceiver that down-converts the RF signal into a baseband signal that is provided to the baseband processor of the processors 1604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1625.

In various embodiments, the RF interface circuitry 1608 may be configured to transmit/receive signals in a manner compatible with NR access technologies.

The antenna 1625 may include a number of antenna elements that each convert electrical signals into radio waves to travel through the air and to convert received radio waves into electrical signals. The antenna elements may be arranged into one or more antenna panels. The antenna 1625 may have antenna panels that are omnidirectional, directional, or a combination thereof to enable beamforming and multiple input, multiple output communications. The antenna 1625 may include micro-strip antennas, printed antennas that are fabricated on the surface of one or more printed circuit boards, patch antennas, phased array antennas, etc. The antenna 1625 may have one or more panels designed for specific frequency bands including bands in FR1 or FR2.

The user interface circuitry 1616 includes various input/output (I/O) devices designed to enable user interaction with the UE 1600. The user interface 1616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs)) and multi-character visual outputs, or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1600.

The sensors 1620 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example, cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1622 may include software and hardware elements that operate to control particular devices that are embedded in the UE 1600, attached to the UE 1600, or otherwise communicatively coupled with the UE 1600. The driver circuitry 1622 may include individual drivers allowing other components to interact with or control various input/output (I/O) devices that may be present within or connected to the UE 1600. For example, driver circuitry 1622 may include a display driver to control and allow access to a display device, a touchscreen driver to control and allow access to a touchscreen interface, sensor drivers to obtain sensor readings of sensor circuitry 1620 and control and allow access to sensor circuitry 1620, drivers to obtain actuator positions of electro-mechanic components or control and allow access to the electro-mechanic components, a camera driver to control and allow access to an embedded image capture device, or audio drivers to control and allow access to one or more audio devices.

The PMIC 1624 may manage power provided to various components of the UE 1600. In particular, with respect to the processors 1604, the PMIC 1624 may control power-source selection, voltage scaling, battery charging, or DC-to-DC conversion.

In some embodiments, the PMIC 1624 may control, or otherwise be part of, various power saving mechanisms of the UE 1600. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1600 may power down for brief intervals of time and thus, save power. If there is no data traffic activity for an extended period of time, then the UE 1600 may transition off to an RRC_Idle state, where it disconnects from the network and does not perform operations, such as channel quality feedback, handover, etc. The UE 1600 goes into a very low power state, and it performs paging where again it periodically wakes up to listen to the network and then powers down again. The UE 1600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed the delay is acceptable.

A battery 1628 may power the UE 1600, although in some examples the UE 1600 may be mounted deployed in a fixed location and may have a power supply coupled to an electrical grid. The battery 1628 may be a lithium-ion battery, a metal-air battery, such as a zinc-air battery, an aluminum-air battery, a lithium-air battery, and the like. In some implementations, such as in vehicle-based applications, the battery 1628 may be a typical lead-acid automotive battery.

Figure 17:
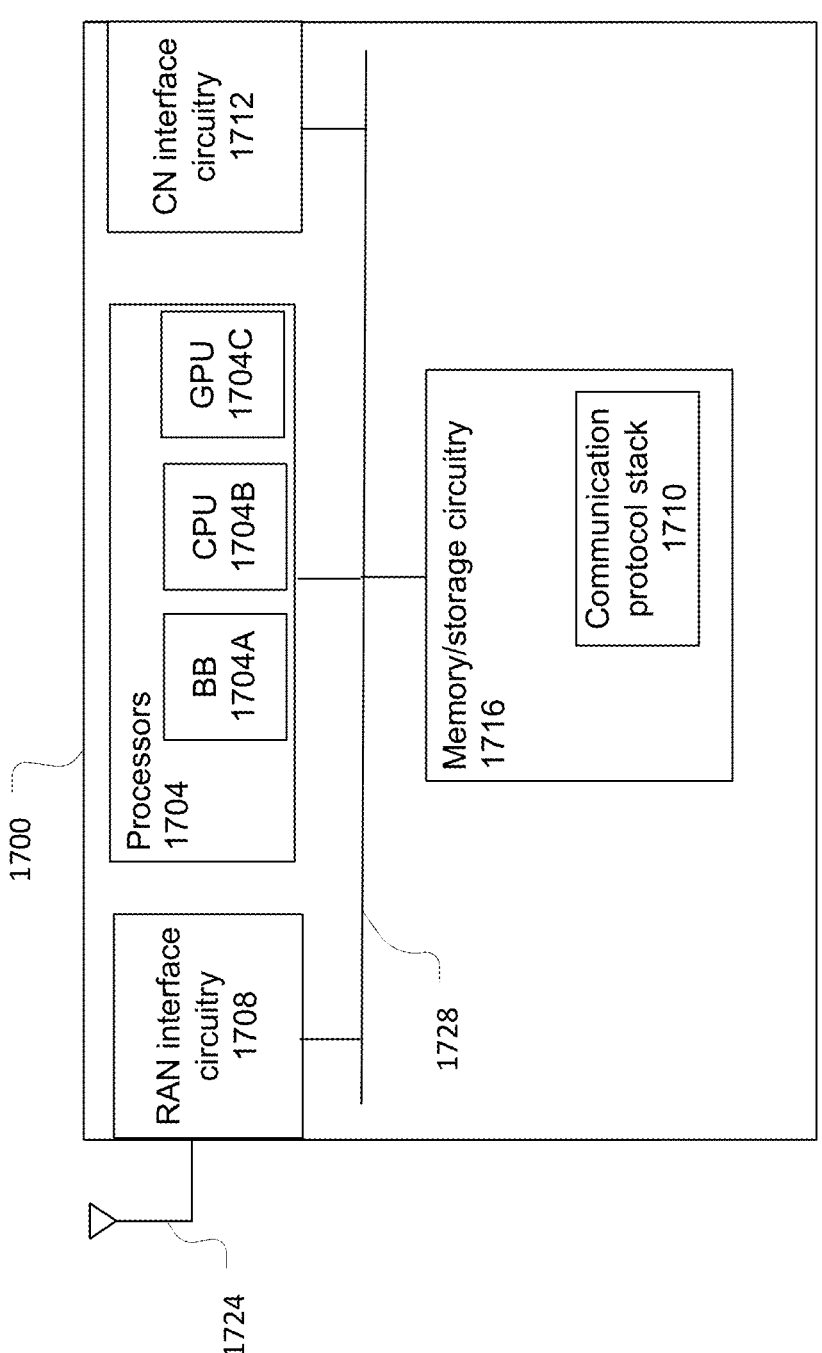
FIG. 17 illustrates an example of a base station, in accordance with some embodiments.

FIG. 17 illustrates a gNB 1700, in accordance with some embodiments. The gNB node 1700 may be similar to and substantially interchangeable with gNB 108.

The gNB 1700 may include processors 1704, RF interface circuitry 1708, core network (CN) interface circuitry 1712, and memory/storage circuitry 1716.

The components of the gNB 1700 may be coupled with various other components over one or more interconnects 1728.

The processors 1704, RF interface circuitry 1708, memory/storage circuitry 1716 (including communication protocol stack 1710), antenna 1724, and interconnects 1728 may be similar to like-named elements shown and described with respect to FIG. 15.

The CN interface circuitry 1712 may provide connectivity to a core network, for example, a $5^{th}$ Generation Core network (5GC) using a 5GC-compatible network interface protocol, such as carrier Ethernet protocols or some other suitable protocol. Network connectivity may be provided to/from the gNB 1700 via a fiber optic or wireless backhaul. The CN interface circuitry 1712 may include one or more dedicated processors or FPGAs to communicate using one or more of the aforementioned protocols. In some implementations, the CN interface circuitry 1712 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate, in accordance with one or more of the examples set forth below. For another example, circuitry associated with a UE, base station, network element, etc., as described above in connection with one or more of the preceding figures, may be configured to operate in accordance with one or more of the examples set forth below in the example section.

Examples

In the following sections, further exemplary embodiments are provided.

Example 1 includes a method implemented by a user equipment (UE), the method comprising: receiving, during an active state of a discontinuous reception (DRX) cycle, a plurality of synchronization signal blocks (SSBs) that respectively correspond to a plurality of beams of a base station; determining a plurality of measurements that respectively correspond to the plurality of SSBs; selecting a first measurement from the plurality of measurements; comparing the first measurement of the plurality of measurements to a measurement threshold; and scheduling, based on said comparing, page monitoring and page receiving on at least two beams of the plurality of beams.

Example 2 includes a method of example 1, wherein the first measurement includes a signal-to-noise ratio (SNR) measurement or a reference signal received power (RSRP) measurement determined based on a first SSB of the plurality of SSBs that corresponds to a first beam of the at least two beams, wherein the page monitoring includes a physical downlink control channel (PDCCH) monitoring of a paging occasion on the first beam, and wherein the page receiving includes a physical downlink shared channel (PDSCH) decoding of a paging message on the first beam.

Example 3 includes a method of any preceding example, further comprising: selecting the first measurement based on a determination the first measurement is a largest measurement of the plurality of measurements.

Example 4 includes a method of any preceding example, further comprising: performing a physical downlink shared channel (PDSCH) decoding of a paging message on a beam of the at least two beams; determining that a successful decoding of the paging message; and stopping at least one of the page monitoring or the page receiving on another beam of the at least two beams.

Example 5 includes a method of any preceding example, wherein the measurement threshold is a first measurement threshold, and wherein the method further comprises: selecting the at least two beams by determining that individual measurements corresponding to the at least two beams are between a second measurement threshold and the first measurement threshold, wherein the second measurement threshold is smaller than the first measurement threshold.

Example 6 includes a method of any preceding example, further comprising: sorting the plurality of beams based on the plurality of measurements; and selecting the highest sorted beam and the next highest sorted beam, wherein the page monitoring and the page receiving are scheduled on only the highest sorted beam and the next highest sorted beam.

Example 7 includes a method of any preceding example, further comprising: performing, based on first soft decoding information, a first physical downlink shared channel (PDSCH) decoding of a first paging message on a first beam of the at least two beams is; and performing, based on second soft decoding information, a second PDSCH decoding of a second instance of the paging message on a second beam of the at least two beams, wherein the second soft decoding information is based on the first soft decoding information.

Example 8 includes a method of example 7, wherein the first soft decoding information and the second soft decoding information include first log-likelihood ratio (LLR) information and second LLR information, respectively, and wherein the second PDSCH decoding is performed using a combination of the first LLR information and the second LLR information.

Example 9 includes a method of example 7, further comprising: determining a decoding failure of the first instance of the paging message, wherein the second PDSCH decoding is performed based on the decoding failure.

Example 10 includes a method of any preceding example, further comprising: performing a first physical downlink shared channel (PDSCH) decoding of a first instance of a paging message on a first beam of the at least two beams; determining whether a decoding failure or a decoding success of the first instance of the paging message occurred; and performing a second PDSCH decoding of a second instance of the paging message on a second beam of the at least two beams based on determining the decoding failure, or skipping the second PDSCH decoding based on determining the decoding success.

Example 11 includes a method of example 10, wherein the decoding failure or the decoding success is determined based on a cyclic redundancy check (CRC) of the first instance of the paging message.

Example 12 includes a method of example 11, wherein the second PDSCH decoding is performed based on a combination of a first log-likelihood ratio (LLR) information of the first PDSCH decoding and a second LLR information of the second PDSCH decoding.

Example 13 includes a method of any preceding example, further comprising: determining that a first beam of the at least two beams is associated with the first measurement that is larger than that of a second beam of the at least two beams;

performing a first physical downlink control channel (PDCCH) monitoring on the first beam to decode first downlink control information (DCI) that indicates a first schedule of a first physical downlink shared channel (PDSCH) decoding of a first instance of a paging message; and performing a second PDCCH monitoring on the second beam to decode second DCI that indicates a second schedule of a second PDSCH decoding of a second instance of the paging message.

Example 14 includes a method of any preceding example, further comprising: determining that a first beam of the at least two beams is associated with the first beam that is larger than that of a second beam of the at least two beams; performing a first physical downlink control channel (PDCCH) monitoring on the first beam to decode first downlink control information (DCI) that indicates a first schedule of a first physical downlink shared channel (PDSCH) decoding of a first instance of a paging message; determining a decoding failure of the first instance of the paging message; and performing, based on the decoding failure, a second PDCCH monitoring on the second beam subsequent to the first PDSCH decoding to decode second DCI that indicates a second schedule of a second PDSCH decoding of a second instance of the paging message on the second beam.

Example 15 includes a method of any preceding example, further comprising: determining that a first beam of the at least two beams is associated with the first measurement that is larger than that of a second beam of the at least two beams; performing a first physical downlink shared channel (PDSCH) decoding on the first beam to decode a first instance of a paging message; determining a decoding failure of the first instance of the paging message; and performing, based on the decoding failure, a second PDSCH decoding on the second beam subsequent to the first PDSCH decoding to decode a second instance of the paging message.

Example 16 includes a method of example 15, wherein the second instance of the paging message is decoded based on combining first soft decoding information used for the first PDSCH decoding and second soft decoding information used for the second PDSCH decoding.

Example 17 includes a UE comprising means to perform one or more elements of a method described in or related to any of the examples 1-16.

Example 18 includes one or more non-transitory computer-readable media comprising instructions to cause a UE, upon execution of the instructions by one or more processors of the UE, to perform one or more elements of a method described in or related to any of the examples 1-16.

Example 19 includes a UE comprising logic, modules, or circuitry to perform one or more elements of a method described in or related to any of the examples 1-16.

Example 20 includes a UE comprising: one or more processors and one or more computer-readable media comprising instructions that, when executed by the one or more processors, cause the one or more processors to perform one or more elements of a method described in or related to any of the examples 1-16.

Example 21 includes a system comprising means to perform one or more elements of a method described in or related to any of the examples 1-16.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:

processing, during an active state of a discontinuous reception (DRX) cycle, a plurality of synchronization signal blocks (SSBs) that respectively correspond to a plurality of beams of a base station;

determining a plurality of measurements that respectively correspond to the plurality of SSBs;

selecting a first measurement from the plurality of measurements;

comparing the first measurement of the plurality of measurements to a measurement threshold;

scheduling, based on said comparing, page monitoring and page receiving on at least two beams of the plurality of beams;

performing a first physical downlink shared channel (PDSCH) decoding of a first instance of a paging message on a first beam of the at least two beams; and performing, by using information from the first PDSCH decoding, a second PDSCH decoding of a second instance of the paging message on a second beam of the at least two beams.

2. The method of claim 1, wherein the first measurement includes a signal-to-noise ratio (SNR) measurement or a reference signal received power (RSRP) measurement determined based on a first SSB of the plurality of SSBs that corresponds to the first beam of the at least two beams, wherein the page monitoring includes a physical downlink control channel (PDCCH) monitoring of a paging occasion on the first beam.

3. The method of claim 1, further comprising:

selecting the first measurement based on a determination the first measurement is a largest measurement of the plurality of measurements.

4. The method of claim 1, further comprising:

determining that a successful decoding of the paging message; and stopping at least one of the page monitoring or the page receiving on another beam of the at least two beams.

5. The method of claim 1, wherein the measurement threshold is a first measurement threshold, and wherein the method further comprises:

selecting the at least two beams by determining that individual measurements corresponding to the at least two beams are between a second measurement threshold and the first measurement threshold, wherein the second measurement threshold is smaller than the first measurement threshold.

6. The method of claim 1, further comprising:

sorting the plurality of beams based on the plurality of measurements; and selecting the highest sorted beam and the next highest sorted beam, wherein the page monitoring and the page receiving are scheduled on only the highest sorted beam and the next highest sorted beam.

7. The method of claim 1 wherein the first PDSCH decoding is performed based on first soft decoding information, wherein the second PDSCH decoding is performed based on second soft decoding information, and wherein the second soft decoding information is based on the first soft decoding information.

8. The method of claim 7, wherein the first soft decoding information and the second soft decoding information include first log-likelihood ratio (LLR) information and second LLR information, respectively, and wherein the second PDSCH decoding is performed using a combination of the first LLR information and the second LLR information.

9. The method of claim 7, further comprising:

determining a decoding failure of the first instance of the paging message, wherein the second PDSCH decoding is performed based on the decoding failure.

10. The method of claim 1, further comprising:

determining whether a decoding failure or a decoding success of the first instance of the paging message occurred; and performing the second PDSCH decoding based on determining the decoding failure.

11. The method of claim 10, wherein the decoding failure or the decoding success is determined based on a cyclic redundancy check (CRC) of the first instance of the paging message.

12. The method of claim 11, wherein the second PDSCH decoding is performed based on a combination of a first log-likelihood ratio (LLR) information of the first PDSCH decoding and a second LLR information of the second PDSCH decoding.

13. An apparatus comprising:

processing circuitry configured to:

process during an active state of a discontinuous reception (DRX) cycle, a plurality of synchronization signal blocks (SSBs) that respectively correspond to a plurality of beams of a base station;

determine a plurality of measurements that respectively correspond to the plurality of SSBs;

select a first measurement from the plurality of measurements;

compare the first measurement of the plurality of measurements to a measurement threshold;

schedule, based on said comparing, page monitoring and page receiving on at least two beams of the plurality of beams;

perform a first physical downlink shared channel (PDSCH) decoding of a first instance of a paging message on a first beam of the at least two beams; and perform, by using information from the first PDSCH decoding, a second PDSCH decoding of a second instance of the paging message on a second beam of the at least two beams.

14. The apparatus of claim 13, wherein the the first PDSCH decoding is performed based on first soft decoding information and wherein the second PDSCH decoding is performed based on the first soft decoding information and second soft decoding information.

15. The apparatus of claim 13, wherein the processing circuitry is further configured to:

determine that the first beam of the at least two beams is associated with the first measurement that is larger than that of the second beam of the at least two beams;

perform a first physical downlink control channel (PDCCH) monitoring on the first beam to decode first downlink control information (DCI) that indicates a first schedule of the first PDSCH decoding; and perform a second PDCCH monitoring on the second beam to decode second DCI that indicates a second schedule of the second PDSCH decoding.

16. The apparatus of claim 13, wherein the processing circuitry is further configured to:

determine that the first beam of the at least two beams is associated with the first measurement that is larger than that of the second beam of the at least two beams;

perform a first physical downlink control channel (PDCCH) monitoring on the first beam to decode first downlink control information (DCI) that indicates a first schedule of the first PDSCH decoding;

determine a decoding failure of the first instance of the paging message; and perform, based on the decoding failure, a second PDCCH monitoring on the second beam subsequent to the first PDSCH decoding to decode second DCI that indicates a second schedule of the second PDSCH decoding.

17. The apparatus of claim 13, wherein the processing circuitry is further configured to:

determine that the first beam of the at least two beams is associated with the first measurement that is larger than that of a second beam of the at least two beams;

determine a decoding failure of the first instance of the paging message; and perform, based on the decoding failure, the second PDSCH decoding on the second beam subsequent to the first PDSCH decoding.

18. The apparatus of claim 17, wherein the second instance of the paging message is decoded based on combining first soft decoding information used for the first PDSCH decoding and second soft decoding information used for the second PDSCH decoding.

19. One or more non-transitory computer-readable media storing instructions that, upon execution on a user equipment (UE), configure the UE to perform operations comprising:

receiving, during an active state of a discontinuous reception (DRX) cycle, a plurality of synchronization signal blocks (SSBs) that respectively correspond to a plurality of beams of a base station;

determining a plurality of measurements that respectively correspond to the plurality of SSBs;

selecting a first measurement from the plurality of measurements;

comparing the first measurement of the plurality of measurements to a measurement threshold;

scheduling, based on said comparing, page monitoring and page receiving on at least two beams of the plurality of beams;

performing a first physical downlink shared channel (PDSCH) decoding of a first instance of a paging message on a first beam of the at least two beams; and performing, by using information from the first PDSCH decoding, a second PDSCH decoding of a second instance of the paging message on a second beam of the at least two beams.

20. The one or more non-transitory computer-readable media of claim 19, wherein the first measurement includes a signal-to-noise ratio (SNR) measurement or a reference signal received power (RSRP) measurement determined based on a first SSB of the plurality of SSBs that corresponds to the first beam of the at least two beams, wherein the page monitoring includes a physical downlink control channel (PDCCH) monitoring of a paging occasion on the first beam.

* * * * *